US012677340B2

(12) United States Patent
Cui et al.

(10) Patent No.: US 12,677,340 B2
(45) Date of Patent: Jul. 7, 2026

(54) HARMONIZED LINK MONITORING AND LINK RECOVERY

(71) Applicant: Apple Inc., Cupertino, CA (US)

(72) Inventors: Jie Cui, San Jose, CA (US); Qiming Li, Beijing (CN); Dawei Zhang, Saratoga, CA (US); Hong He, San Jose, CA (US); Huaning Niu, San Jose, CA (US); Manasa Raghavan, Sunnyvale, CA (US); Xiang Chen, Campbell, CA (US); Yang Tang, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1326 days.

(21) Appl. No.: 17/441,252

(22) PCT Filed: Jun. 7, 2021

(86) PCT No.: PCT/CN2021/098649
§ 371 (c)(1),
(2) Date: Dec. 15, 2022

(87) PCT Pub. No.: WO2022/256974
PCT Pub. Date: Dec. 15, 2022

(65) Prior Publication Data
US 2024/0032128 A1      Jan. 25, 2024

(51) Int. Cl.
*H04W 76/19*      (2018.01)
*H04B 7/06*       (2006.01)
*H04L 5/00*       (2006.01)
*H04W 72/542*     (2023.01)
*H04W 76/15*      (2018.01)

(52) U.S. Cl.
CPC ........ *H04W 76/19* (2018.02); *H04B 7/06964* (2023.05); *H04L 5/0051* (2013.01); *H04W 72/542* (2023.01)

(58) Field of Classification Search
CPC ... H04W 76/19; H04W 72/542; H04W 76/15; H04B 7/06964; H04L 5/0051
See application file for complete search history.

(56) References Cited

U.S. PATENT DOCUMENTS

| | | | | |
|---|---|---|---|---|
| 11,902,217 | B2 * | 2/2024 | Grant ................... | H04B 7/0617 |
| 12,010,671 | B2 * | 6/2024 | Kiilerich Pratas .. | H04W 72/046 |
| 12,250,099 | B2 * | 3/2025 | Preciado ................ | H04L 12/12 |
| 12,363,047 | B2 * | 7/2025 | Chen ...................... | H04L 69/324 |
| 2017/0118700 | A1 * | 4/2017 | Lee ........................ | H04W 48/20 |

(Continued)

FOREIGN PATENT DOCUMENTS

| | | |
|---|---|---|
| CN | 111066344 A | 4/2020 |
| CN | 112740819 | 4/2021 |

(Continued)

OTHER PUBLICATIONS

Draft CR: Update of beam Management Test Cases for NR-U, 3GPP TSG-RAN4 Meeting # 98bis-e, R4-2105724, Apr. 20, 2021, 58 pages.

(Continued)

*Primary Examiner* — Harry H Kim
(74) *Attorney, Agent, or Firm* — Kilpatrick Townsend & Stockton LLP

(57)          ABSTRACT

The present application relates to devices and components including apparatus, systems, and methods for harmonized link monitoring and link recovery.

20 Claims, 12 Drawing Sheets

100

(56) References Cited

U.S. PATENT DOCUMENTS

| | | | |
|---|---|---|---|
| 2020/0092784 A1* | 3/2020 | Hampel ................ | H04W 40/22 |
| 2020/0314711 A1* | 10/2020 | Basu Mallick . | H04W 36/00838 |
| 2021/0028852 A1 | 1/2021 | Hwang et al. | |
| 2021/0105060 A1* | 4/2021 | Venugopal ............ | H04L 5/0094 |
| 2022/0225135 A1* | 7/2022 | Cirik ..................... | H04W 24/08 |
| 2022/0385351 A1* | 12/2022 | Zhou ................. | H04B 7/06964 |
| 2023/0300645 A1* | 9/2023 | Kwak ................... | H04W 24/08 |
| | | | 370/242 |
| 2023/0327738 A1* | 10/2023 | Zhou ................... | H04B 17/318 |
| | | | 370/329 |
| 2024/0032128 A1* | 1/2024 | Cui ..................... | H04W 72/542 |
| 2024/0179548 A1* | 5/2024 | Koskela ............... | H04W 24/08 |
| 2024/0259077 A1* | 8/2024 | Cirik ................... | H04B 7/0695 |
| 2025/0063545 A1* | 2/2025 | Nguyen ............... | H04W 72/02 |
| 2025/0193848 A1* | 6/2025 | El Hamss .......... | H04W 72/542 |

FOREIGN PATENT DOCUMENTS

| | | |
|---|---|---|
| WO | 2020167857 | 8/2020 |
| WO | 2020231832 | 11/2020 |

OTHER PUBLICATIONS

Summary #2 on Remaing Issues on Beam Failure Recovery, 3GPP TSG RAN WG1 Meeting #94, R1-1809926, Aug. 24, 2018, 30 pages.

Summary 2 on Remaing issues on Beam Failure Recovery, 3GPP TSG RAN WG1 Meeting #93, R1-1807796, May 25, 2018, 29 pages.

Test Cases on Link Recovery and L1-RSRP Reporting for NR-U, 3GPP TSG-RAN WG4 Meeting #98bis-e, R4-2106874, Apr. 20, 2021, 5 pages.

International Patent Application No. PCT/CN2021/098649, International Search Report and Written Opinion, Mailed on Mar. 9, 2022, 9 pages.

Motivation paper for R18 RRM enhancement, Apple Inc., 3GPP TSG-RAN Meeting #93e, RP-211948, Sep. 13- 17, 2021, 19 pages.

3rd Generation Partnership Project; Technical Specification Group Radio Access Network; NR; Requirements for support of radio resource management (Release 17), 3GPP TS 38.133 V17.1.0, Mar. 2021, 2173 pages.

3rd Generation Partnership Project; Technical Specification Group Radio Access Network; NR; Physical layer procedures for data (Release 16), 3GPP TS 38.214 V16.5.0, Mar. 2021, 171 pages.

3rd Generation Partnership Project; Technical Specification Group Radio Access Network; NR; Radio Resource Control (RRC) protocol specification (Release 16), 3GPP TS 38.331 V16.4.1, Mar. 2021, 949 pages.

Corrections on Number of Radio LinkMonitoringRS Configuration, 3 Generation Partnership Project Technical Specification Group-Radio Access Network 2 Meeting #104, R2-1816934, Nov. 12-16, 2018, 4 pages.

Summary of Offline Discussion for NR Radio Link Monitoring, 3 Generation Partnership Project Technical Specification Group-Radio Access Network Working Group 1 Meeting #92bis, R1-1805967, Apr. 16-20, 2018, 11 pages.

China Patent Application No. 202180006928.9, Office Action, Mar. 27, 2025, 8 pages.

International Patent Application No. PCT/CN2021/098649, International Preliminary Report on Patentability, Dec. 21, 2023, 6 pages.

* cited by examiner

900

Transmitting first information to UE to
configure LM/LR reference signals
904

Receiving indication of pre-alarm condition
908

Transmitting second information to the UE
to configure new LM reference signal
912

1000

Receiving information to configure SSB as
LM/LR reference signal, SSB corresponding
to first beam
1004

Evaluating beams covered by first beam
1008

Selecting second beam from evaluated
beams
1012

Performing LM/LR procedure based on
second beam
1016

HARMONIZED LINK MONITORING AND LINK RECOVERY

CROSS-REFERENCES TO RELATED APPLICATIONS

This application is a U.S. National Stage Application of PCT/CN2021/098649 filed Jun. 7, 2021. The disclosure of which is herein incorporated by reference in its entirety for all purposes.

BACKGROUND

Third Generation Partnership Project (3GPP) defines separate processes for beam management and radio link monitoring (RLM). Beam management may include using beam failure detection (BFD) to trigger a beam failure (BF), followed by candidate beam detection (CBD)/beam failure recovery (BFR) to identify and recover a candidate beam. RLM is used to detect downlink radio link quality on a primary serving cell (PCell) of a master cell group (MCG) and, if a secondary cell group (SCG) is configured, on a primary SCG cell (PSCell).

DETAILED DESCRIPTION

Figure 1:
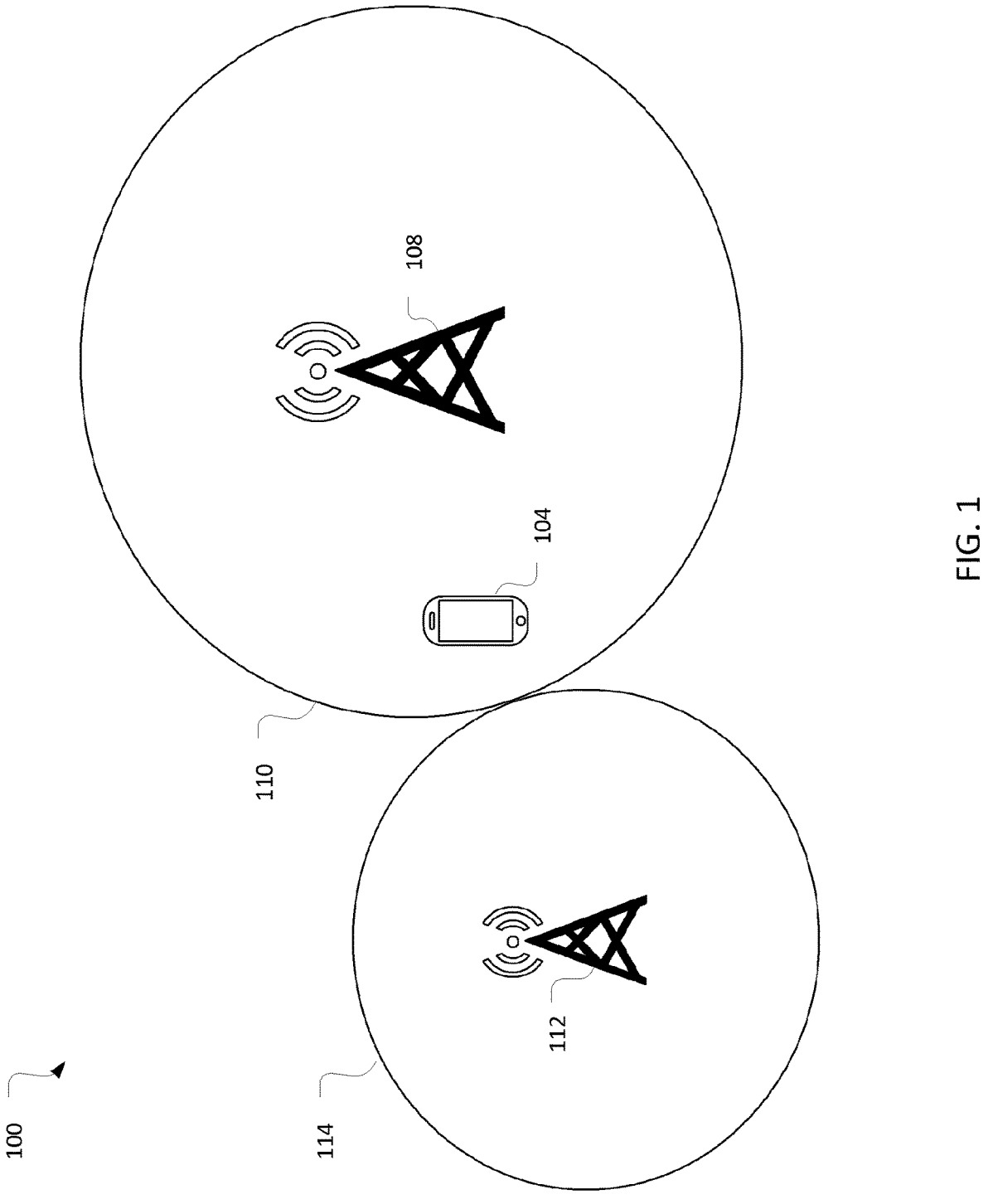
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various aspects. However, it will be apparent to those skilled in the art having the benefit of the present disclosure that the various aspects of the various aspects may be practiced in other examples that depart from these specific details. In certain instances, descriptions of well-known devices, circuits, and methods are omitted so as not to obscure the description of the various aspects with unnecessary detail. For the purposes of the present document, the phrases "A or B" and "A/B" mean (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some aspects, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these aspects, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, or network interface cards.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, or a reconfigurable mobile device. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, or workload units. A "hardware resource" may refer to compute, storage, or network resources provided by physical hardware element(s). A "virtualized resource" may refer to compute, storage, or network resources provided by virtualization infrastructure to an application, device, or system. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a UE 104, a base station 108, and a base station 112. The base station 108 may provide a serving cell 110 through which the UE 104 may communicate with the base station 108. The base station 112 may provide a neighbor cell 114. In some embodiments, the base stations 108/112 are next-generation node Bs (gNBs) that provide 3GPP New Radio (NR) cell. In other embodiments, the base stations 108/112 are evolved node Bs (eNBs) that provides Long Term Evolution (LTE) cells. The air interfaces over which the UE 104 and base stations 108/112 communicate may be compatible with 3GPP technical specifications such as those that define Fifth Generation (5G) NR system standards.

To adapt to changes in a radio environment and relative positioning between the UE 104 and the base stations 108/112, the UE 104 may be configured to perform a variety of measurements on reference signals transmitted in the serving cell 110 or the neighbor cell 114. The reference signals may include channel state information-reference signals (CSI-RSs) and synchronization signal blocks (SSBs). The base station 108 may transmit measurement configurations to provide the UE 104 with information to perform the reference signal measurements.

As briefly discussed above, existing networks provide UEs with separate and independent configurations for beam management and RLM. Thus, the UE needs to maintain the different configurations that define various timers, counters, and reference signals for each process.

Existing RLM processes include a physical (PHY) layer measuring signal-to-interference-plus-noise ratio (SINR) levels of reference signals. These may be referred to as L1 measurements. The PHY layer may generate out-of-sync (OOS) or in-sync (IS) indications based on comparing the measurements to various quality levels. For example, a UE may generate OOS indications if all reference signals of a measurement period are below a first quality level (Qout) at which the radio link is considered unreliable, which may be based on an OOS BLER value of a hypothetical PDCCH transmission; and generate an IS indication if at least one reference signal of the measurement period exceeds a second quality level (Qin) at which the radio link is considered reliable, which may be based on an in-sync BLER value of the hypothetical PDCCH transmission. The measurement period may have a periodicity referred to as an in-sync/out-of-sync (IS/OOS) periodicity. In some embodiments, the out-of sync BLER may be set at 10% and the in-sync BLER may be set at 2%.

The PHY layer may provide the OOS/IS indications to an RRC layer, which determines whether a radio link failure (RLF) occurs based on receipt of the indications and values of counters and timer. For example, the RRC layer may start a timer, T310, if the RRC layer receives N310 consecutive out-of-sync indications and may stop and reset T310 if the RRC layer receives N311 consecutive in-sync indications. If T310 expires, the RRC layer may declare an RLF and initiate an RLF recovery procedure, for example, a connection reestablishment procedure.

Existing BFD is an SINR-based evaluation that has a lower hypothetical PDCCH power than that used for determining OOS states for RLM. The CBD is based on L1 reference signal receive power (RSRP) measurements performed by the PHY layer that are delivered to the MAC layer. The BFD may include a 10% target BLER.

Embodiments of the present disclosure rely on commonality of beam management and RLM in higher frequency ranges to provide harmonized link monitoring (LM) and link recovery (LR) in these frequency ranges. As used herein, higher frequency ranges may include frequency ranges above Frequency Range 1 (FR1). For example, higher frequency ranges may include Frequency Range 2 (FR2), 24,250-52,600 MHz, and above.

In the higher frequency ranges, beam quality may have a closer correspondence to overall link quality. This may be at least partially due to noise being the assumed limiting factor in the higher frequency ranges as opposed to interference. Using L1-RSRP to recover the link may also be feasible as the SINR evaluation in IS detection may not have an obvious gain over the RSRP evaluation.

In general, in the higher frequency ranges, the PHY measurement behavior may be quite similar among RLM and BFD, with the primary discrepancies being between the sliding window sizes and the L1 intervals.

Providing the harmonized LM/LR may, among other things, avoid scheduling/measurement restrictions that would be caused by RLM/BFD having certain configurations (for example, SSB-based RLM) in the higher frequency ranges.

Aspects of the harmonized LM/LR in the higher frequency ranges may be briefly introduced as follows.

Some aspects include specific procedures to enable harmonized LM/LR in the higher frequency ranges. These procedures may include monitoring and recovering for both link and beam as well as reference signal (RS) configuration to facilitate this monitoring and recovering. Monitoring may trigger an RLF if recovery cannot find an acceptable beam. A monitoring and recovery indication may be delivered to the radio resource control (RRC) layer. In some aspects, monitoring may trigger a pre-RLF status. The pre-RLF status may indicate that the link is associated with a diminished quality, but may still be serviceable. The network may use this pre-RLF status, which may also be referred to as a pre-alarm, to reconfigure the UE 104 in a manner to avoid RLF. Quality levels associated with the pre-alarm may be similar to minimum requirements in BFD/CBD. LR, as described herein, may include procedures in which the UE 104 indicates a new reference signal to the network, or directly triggers a new random-access channel (RACH) based on the new reference signal. In some embodiments, the UE 104 may not otherwise inform the network of the LR.

Some aspects of the disclosure describe hypothetical parameter designs for evaluating LM/LR. These parameters designs may involve, or otherwise relate to, thresholds based on RSRP, SINR, or target BLER, and may be predetermined or network configured. Some embodiments describe a power boosting parameter that may be configured by the network.

Some aspects of the disclosure describe L1 evaluation periods for obtaining LM/LR samples. LM/LR evaluation periods may be configured by a network or preconfigured by a 3GPP TS. LM evaluation periods may be configured to align with L1 or L3 measurement periods. Alternatively, the LM evaluation periods may be explicitly indicated with other values. LR evaluation periods may be configured to align with L1 or L3 measurement periods, or may be explicitly indicated with other values. In some embodiments, the LR evaluation periods may be provided (by network or TS) as a ratio of the LM evaluation period. For example, the LR evaluation period may be X % of the LM evaluation period.

Some aspects of the disclosure describe L1 intervals that may be used to set the sliding windows for obtaining the LM/LR samples through the L1 evaluation periods. The L1 interval may be based on the measurement design discussed above with respect to the LM/LR evaluation periods.

Some aspects of the disclosure describe the network configuring the UE 104 with timers to facilitate the LM/LR operations. For example, the network may configure the UE 104 with a timer to trigger RLF for LM and a timer for UE 104 to turn off transmit (Tx) radio-frequency (RF) circuitry and initiate an RRC reestablishment. The network may additionally/alternatively configure a timer for the UE 104 to trigger LR to identify an acceptable beam.

Some aspects of the disclosure describe beam sweeping in which all reference signals are allowed at the UE 104 to have beam sweeping regardless of whether quasi-co-location (QCL) information is provided. The reference signals may be used to perform beam sweeping based on beam information with all configured CORESET QCL information.

Some aspects of the disclosure describe utilizing harmonized LM/LR operation when multiple transmit receive points (TRPs) are configured. For example, LM/LR may be based on a TRP level (for example, further enhanced multiple input multiple output (FeMIMO)) or CORESET pool (multiple transmission configuration indicator (TCI) case, one TRP own a CORESET pool), for example, anchor TRP; CORESET pool index. For another example, LM/LR may be based on component carrier (CC) level when independent beam management (IBM) is permitted in carrier aggregation (CA). This may be used to replace the beam management on CCs.

These and other aspects of harmonized LM/LR operation may be described in further detail as follows.

In general, the UE 104 may perform harmonized LM/LR by monitoring LM reference signals to determine whether an LR evaluation is triggered. If the LR evaluation is triggered, the UE 104 may monitor the LR reference signals.

In a first option, the LR evaluation may be triggered after the LM operation triggers enhanced OOS (eOOS). The LM operation may include monitoring one or more LM reference signals to determine an evaluation metric and comparing the evaluation metric to a corresponding threshold to determine whether the LM reference signal is in an eOOS state. If all, at least one, or some other number of configured LM reference signals have an eOOS state, the UE 104 may determine that an eOOS condition is present.

In a second option, LR may be triggered before LM triggers eOOS, but after a pre-alarm condition has been detected. The pre-alarm condition may be detected based on comparing the evaluation metric of the LM reference signal(s) to a pre-alarm threshold, which may correspond to a relatively higher quality than the corresponding eOOS threshold. Depending on the evaluation metric used, this may mean a higher SINR threshold, a lower target BLER threshold, or a higher RSRP threshold. Thus, the pre-alarm condition would be detected before detecting the eOOS condition.

The LR operation may include the UE 104 monitoring the LR reference signals to determine whether an evaluation metric of any of the LR reference signals indicates a link quality higher than a corresponding LR threshold.

In some embodiments, the LR operation may be performed in parallel with the LM operation.

If the LM operation keeps triggering an eOOS condition within a certain time period and the LR operation cannot find link/beam of acceptable quality, the UE 104 may trigger an RLF and RRC reestablishment. If the LM operation keeps triggering an eOOS condition within the certain time period and the LR operation finds a link/beam of acceptable quality, the UE 104 may perform a RACH operation to indicate the new beam to the network, or may send an indication of the new beam to the network by MAC/RRC signaling.

Figure 2:
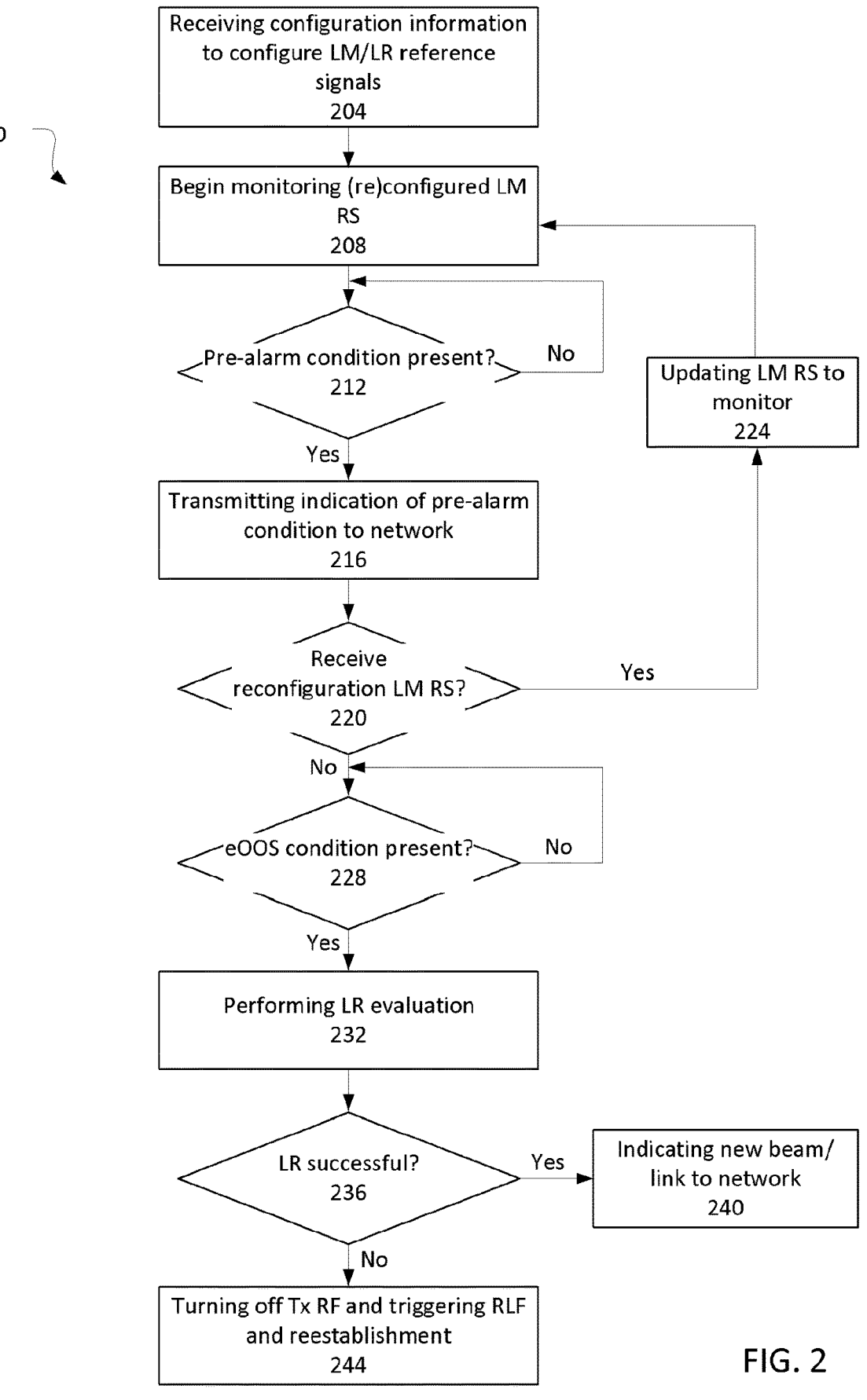
FIG. 2 illustrates an operation flow/algorithmic structure in accordance with some embodiments.

FIG. 2 illustrates an operation flow/algorithmic structure 200 in accordance with some embodiments. The operation flow/algorithmic structure 200 may be implemented by UE 104 to perform harmonized LM/LR.

The operation flow/algorithmic structure 200 may include, at 204, receiving LM RS and LR RS configuration information. The configuration information may configure reference signals to be used for LM/LR. The reference signals may be CSI-RS or SSB. In some embodiments, the LM reference signals may be the same as the LR reference signals; the LM reference signals may be a subset of the LR reference signals; or the LM reference signals may be a superset of the LR reference signals.

The LM/LR reference signals may be configured jointly with one another or independently from one another.

In some embodiments, the LM/LR reference signal configurations may be based on a CORESET configuration. The network (for example, base station 108) may configure the UE 104 with a CORESET configuration that provides QCL information by listing identities of one or more transmission configuration indicator (TCI) states. The identities may correspond to TCI-state parameter structures, with individual TCI-state parameter structures having one or two QCL instances. The QCL instance may be linked to a specific SSB or CSI-RS and may also include a QCL type that indicates which large scale channel characteristics are common between the PDCCH and the SSB/CSI-RS. The QCL types may be QCL type A having common Doppler shift, Doppler spread, average delay, and delay spread; QCL type B having common Doppler shift and Doppler spread; QCL Type C having common Doppler shift and average delay; or QCL Type D having common spatial receive parameters. If only a single TCI state is listed within the CORESET parameter structure, the UE 104 may assume the QCL state In some embodiments, the LM reference signals may be the same as the reference signals in the TCI state(s) of the configured CORESET. The LR reference signals may either be the same as the LM reference signals or may be different from the LM reference signals. If the LR reference signals are different from the LM reference signals, the LR reference signals may be separately configured by the network.

In some embodiments, the configuration information may be transmitted to the UE 104 from the network (for example, the base station 108) using one or more of the configuration parameters. A first resource configuration option may be provided by an enhanced LR/LM configuration information element (EnhancedLRandLMConfig) that is used to configure reference signals and pre-alarm information for LM/LR as follows.

```
EnhancedLRandLMConfig ::=    SEQUENCE {
    enhancedLRandLMToAddModList    SEQUENCE
SIZE(1..maxNrofEnhancedLRandLMRS)) OF EnhancedLMandLRRS
    enhancedLRandLMToReleaseList    SEQUENCE
(SIZE(1..maxNrofEnhancedLRandLMRS)) OF EnhancedLRandLMRS-Id
    ...
}
EnhancedLRandLMRS ::=    SEQUENCE {
    EnhancedLRandLMRS-Id    EnhancedLRandLMRS-Id,
    purpose    ENUMERATED {LM, LR, both},
    ReferenceSignal    CHOICE {
        ssb-Index    SSB-Index,
        csi-RS-Index    NZP-CSI-RS-ResourceId
    },
    Pre-alarm Threshold    value from RSRP range or SINR range or RSRQ range; only
LM-RS or both could apply pre-alarm threshold
    Pre-alarmEvaDuration    Pre-alarm evaluation period
    ...
}
```

40

A second resource configuration option may be provided by an enhanced LR/LM configuration information element (EnhancedLRandLMConfig) that is used to configure reference signals and pre-alarm information for LM/LR as follows.

```
EnhancedLRandLMConfig ::=    SEQUENCE {
    enhancedLRandLMToAddModList    SEQUENCE
(SIZE(1..maxNrofEnhancedLRandLMRS)) OF EnhancedLRandLMRS
    enhancedLRandLMToReleaseList    SEQUENCE
(SIZE(1..maxNrofEnhancedLRandLMRS)) OF EnhancedLRandLMRS-Id
    Pre-alarm Threshold    value from RSRP range or SINR range or RSRQ range; only
LM-RS or both could apply pre-alarm threshold
    Pre-alarmEvaDuration    Pre-alarm evaluation period
    ...
}
EnhancedLRandLMRS ::=    SEQUENCE {
    EnhancedLRandLMRS-Id    EnhancedLRandLMRS-Id,
    purpose    ENUMERATED {LM, LR, both},
    ReferenceSignal    CHOICE {
        ssb-Index    SSB-Index,
        csi-RS-Index    NZP-CSI-RS-ResourceId
    },
    ...
}
```

These options may differ in that the first configuration option may allow for each reference signal to have a corresponding pre-alarm threshold and evaluation period, while the second configuration option may provide one pre-alarm threshold and evaluation period for all of the reference signals.

The operation flow/algorithmic structure 200 may further include, at 208, the UE 104 beginning to monitor the configured LM reference signals. The monitoring of the LM RS may include measuring an evaluation metric of the LM reference signal(s). The evaluation metric may be SINR, RSRP, or RSRQ.

The operation flow/algorithmic structure 200 may further include, at 212, determining whether a pre-alarm condition is present. This determination may be done by comparing the evaluation metric of a pre-alarm evaluation period to a pre-alarm threshold as configured by the network.

In the event that a pre-alarm condition is not present, the operation flow/algorithmic structure 200 may continue to check for the pre-alarm condition at 212.

In the event that the pre-alarm condition is present, the operation flow/algorithmic structure 200 may advance to transmitting an indication of the pre-alarm condition to the network.

If the first configuration option described above is used, where each reference signal may be associated with its own pre-alarm threshold/evaluation period, the indication of the pre-alarm condition may be provided by the UE 104 transmitting a pre-alarm indication (Pre-alarmIndication) defined as follows:

```
Pre-alarm Indication ::=     SEQUENCE {
    ServingcellIndex      CellID
    Pre-alarmIndicationList      SEQUENCE (SIZE(1 .. maxNrofEnhancedLinkMonitoringRS))
OF EnhancedLinkMonitoringRS-ID
    ...
}
```

If the second configuration option described above is used, where all the reference signals are associated with the same pre-alarm threshold/evaluation period, the indication of the pre-alarm condition may be provided by the UE 104 transmitting a prealarm indication (Pre-alarmIndication) defined as follows:

```
Pre-alarm Indication ::=     SEQUENCE {
    ServingcellIndex      CellID
    ...
}
```

The network, upon receiving the pre-alarm indication, may or may not reconfigure LM reference signals. The operation flow/algorithmic structure 200 may include determining whether a reconfiguration of the LM reference signals is received at the UE at 220.

If the reconfiguration of the LM reference signals is received, the operation flow/algorithmic structure 200 may advance to updating the LM reference signals to monitor at 224 and may further advance to begin monitoring the reconfigured LM reference signals at 208.

If the reconfiguration of the LM reference signals is not received, the operation flow/algorithmic structure 200 may advance to determining whether an eOOS condition is present. In general, the UE 104 may determine an eOOS condition is present if a predetermined number of the configured LM reference signals have an eOOS state. The predetermined number, which may be provided by the network or by a TS, may be one, all, or some other number. An LM reference signal may have an eOOS state if its evaluation metric indicates a quality is less than an LM threshold. The evaluation metric may be obtained by monitoring the LM reference signal in a corresponding LM evaluation period.

In other embodiments, the eOOS condition may be present if a predetermined number of LM reference signals are associated with an eOOS state for a corresponding LM evaluation period.

In the event that the eOOS condition is not present, the operation flow/algorithmic structure 200 may continue to check for the eOOS condition at 228.

In the event that the eOOS condition is present, the operation flow/algorithmic structure 200 may advance to performing an LR evaluation at 232 and determining whether the LR was successful at 236.

The LR evaluation may include comparing LR reference signal evaluation metrics to a corresponding threshold. If an LR reference signal has an evaluation metric better than a corresponding LR threshold, the LR reference signal may indicate the presence of a link/beam that has an acceptable quality.

If at least one LR reference signal has an evaluation metric better than a corresponding LR threshold, the LR evaluation may be considered to be successful at 236. In this event, the operation flow/algorithmic structure 200 may advance to indicating the new beam/link that corresponds to the LR reference signal to the network. The network may facilitate the transition of the UE connection to the new beam/link.

If none of the LR reference signals have an evaluation metric better than the corresponding LR threshold, the LR evaluation may be considered to be unsuccessful at 236. In this event, the operation flow/algorithmic structure 200 may advance to turning off the Tx RF circuitry (as the uplink transmissions may no longer be reliable) and triggering RLF. The UE 104 may then initiate an RRC connection reestablishment procedure to recover its connection.

Figure 3:
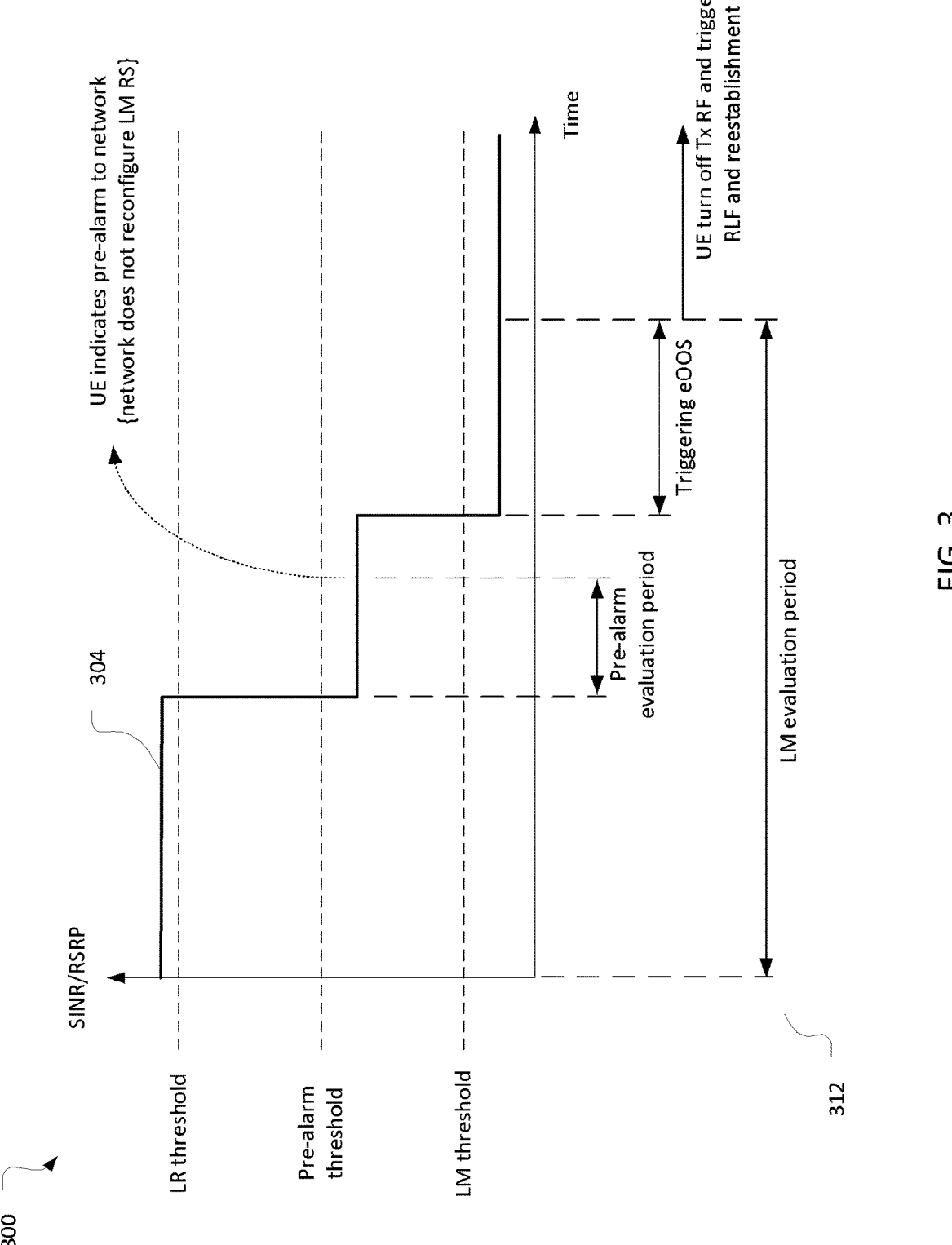
FIG. 3 illustrates a link monitoring/link recovery procedure in accordance with some embodiments.
Figure 4:
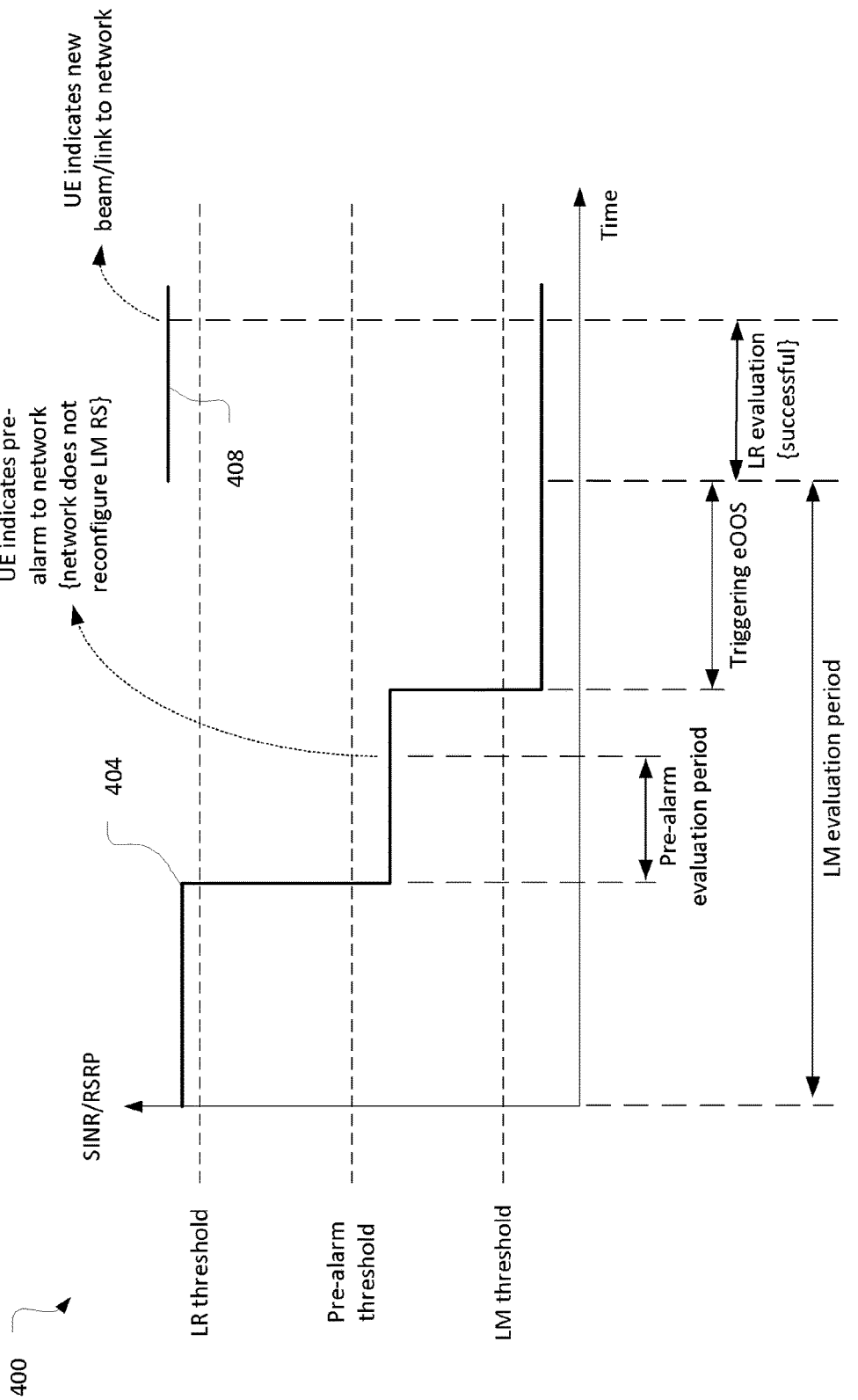
FIG. 4 illustrates another link monitoring/link recovery procedure in accordance with some embodiments.
Figure 5:
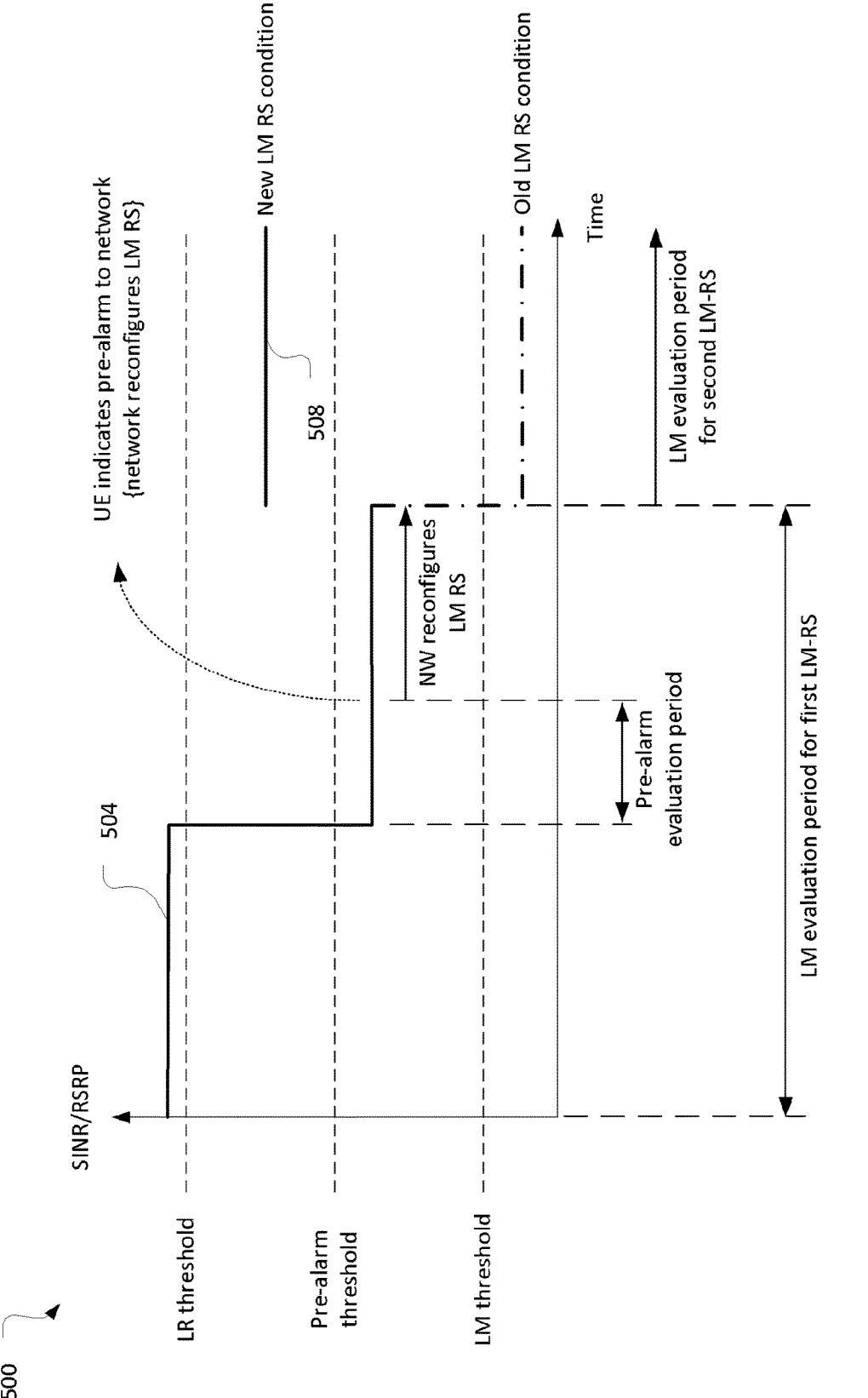
FIG. 5 illustrates another link monitoring/link recovery procedure in accordance with some embodiments.

FIGS. 3-5 illustrate harmonized LM/LR procedures with a hypothetical parameter designed for evaluation in accordance with some embodiments. The hypothetical parameter design may include comparing various evaluation metrics to thresholds. The evaluation metrics/thresholds may be based on RSRP, SINR, or target BLER. The thresholds may be configured by the network or hardcoded in compliance with 3GPP TSs, for example.

In some embodiments, the evaluation metrics/thresholds may be adjusted based on various configuration parameters provided by the network. For example, the evaluation metric/thresholds may be adjusted based on a power boosting parameter, an aggregation level, or a control channel element (CCE) level. A power boosting parameter is a relative power delta between the RS and PDCCH. For example, if the target PDCCH BLER is defined as X %, and the target RS SINR to achieve such BLER threshold is YdB; the RS target SINR would be reduced by $\Delta P$ if the power boosting parameter is set as $\Delta P$ since the real SINR is estimated on RS rather than on PDCCH. That means the target SINR threshold has been adjusted by using different power boosting parameter. Similar adjustments may also be made based on aggregation level and CCE level.

FIG. 3 illustrates a harmonized LM/LR procedure 300 with pre-alarm detection in accordance with some embodiments. The harmonized LM/LR procedure 300 may include an SINR or RSRP evaluation metric. Line 304 represents an evaluation metric of an LM reference signal over time. The line 304 may start above an LR threshold, which may be the threshold used for purposes of evaluating LR reference signals.

After the line 304 drops below a pre-alarm threshold for a pre-alarm evaluation period, the UE 104 may detect a pre-alarm condition and provide an indication of the condition to the network. In this instance, the network may not reconfigure LM RSs, and the line 304 may continue to drop.

After the line 304 drops below an LM threshold, the UE 104 may register eOOS states. In the event the eOOS states of an LM evaluation period trigger an eOOS condition, the UE 104 may perform an LR procedure. In this instance, the LR procedure may not be successful (for example, an LR reference signal with an evaluation metric above the LR threshold may not be identified) and the UE 104 may turn off the Tx RF and trigger RLF to perform an RRC reestablishment procedure.

FIG. 4 illustrates a harmonized LM/LR procedure 400 with pre-alarm detection in accordance with some embodiments. The harmonized LM/LR procedure 400 may include an SINR or RSRP evaluation metric. Line 404 represents an evaluation metric of an LM reference signal over time and line 408 represents an evaluation metric of an LR reference signal over time.

After the line 404 drops below a pre-alarm threshold for a pre-alarm evaluation period, the UE 104 may detect a pre-alarm condition and provide an indication of the condition to the network. In this instance, the network may not reconfigure LM RSs, and the line 404 may continue to drop.

After the line 404 drops below the LM threshold, the UE 104 may register eOOS states. In the event the eOOS states of an LM evaluation period trigger an eOOS condition, the UE 104 perform an LR procedure. In this instance, the LR procedure may be successful as indicated by line 408 being above the LR threshold. Thus, the UE 104 may transmit an indication of the new beam/link that corresponds to the LM reference signal to the network.

FIG. 5 illustrates a harmonized LM/LR procedure 500 with pre-alarm detection in accordance with some embodiments. The harmonized LM/LR procedure 500 may include an SINR or RSRP evaluation metric. Line 504 represents an evaluation metric of a first LM reference signal over time and line 508 represents an evaluation metric of a second LM reference signal over time.

The UE 104 may be initially configured with the first LM reference signal and may monitor the first LM reference signal throughout an LM evaluation period for the first LM reference signal. After the line 404 drops below a pre-alarm threshold for a pre-alarm evaluation period, the UE 104 may detect a pre-alarm condition and provide an indication of the condition to the network. In this instance, the network may reconfigure LM RSs by providing the UE 104 with a configuration for the second LM reference signal. At this point, the UE 104 may begin to monitor the second LM reference signal for the LM evaluation period for the second LM reference signal and may change the connection to correspond to the second LM reference signal. As shown by line 508, the evaluation metric of the second LM reference signal may be over the pre-alarm threshold. Thus, no pre-alarm condition may be detected.

While the LR/pre-alarm/LM thresholds of FIGS. 3-5 are shown as being based on RSRP/SINR, in other embodiments, one or more of these thresholds may be based on a target BLER. The target BLER may be defined based on PDCCH transmission parameters such as those defined in Table 8.1.2.1-1 of 3GPP TS 38.133 v17.1.0 (2021-04-12) when the LM/LR reference signals are SSBs or Table 8.1.3.1-1 of 3GPP TS 38.133 when the LM/LR reference signals are CSI-RSs. In these embodiments, the evaluation metric may be considered to be better than the target BLER threshold if it is less than the threshold (in contrast to the examples shown in FIGS. 3-5).

Figure 6:
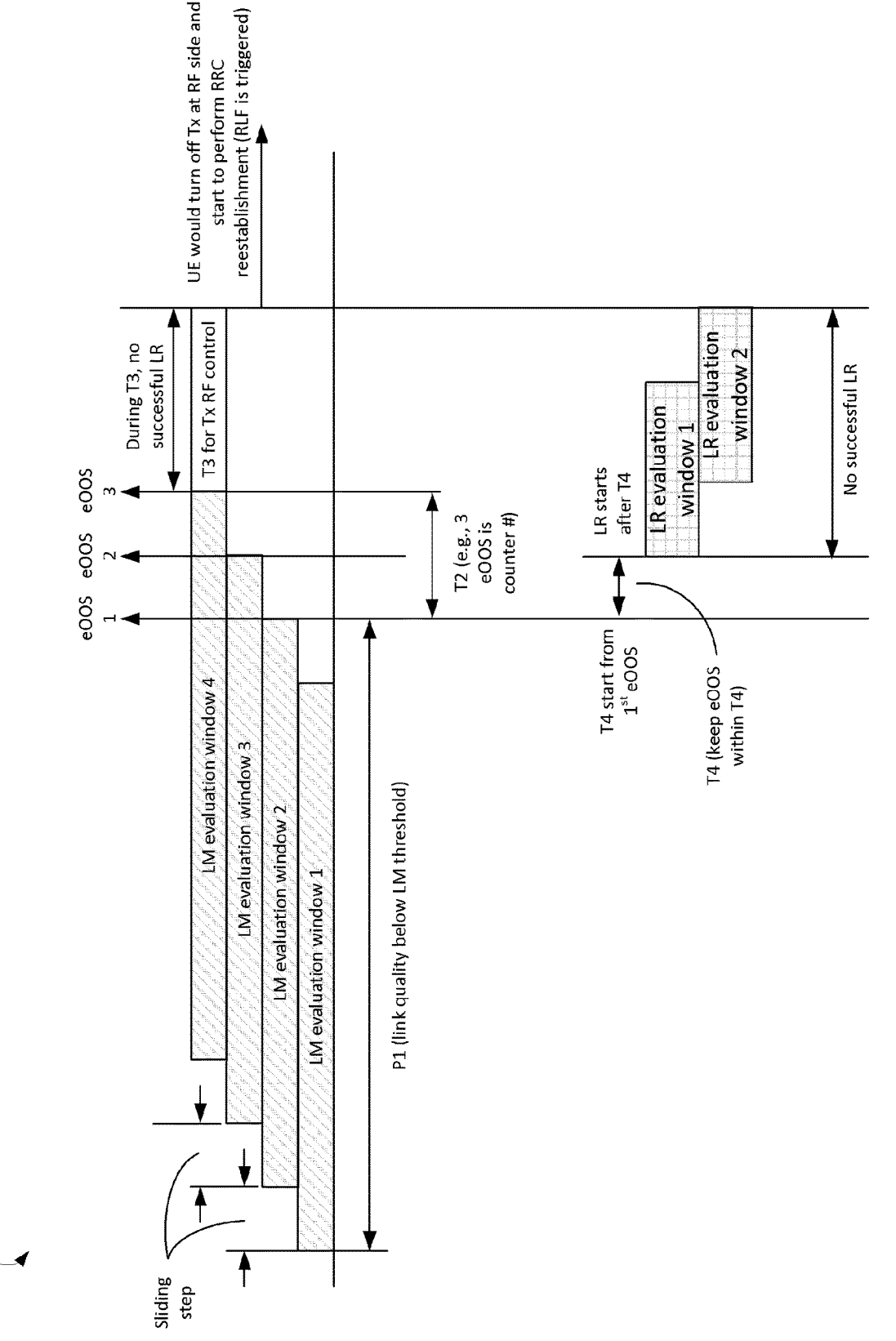
FIG. 6 illustrates another link monitoring/link recovery procedure in accordance with some embodiments.
Figure 7:
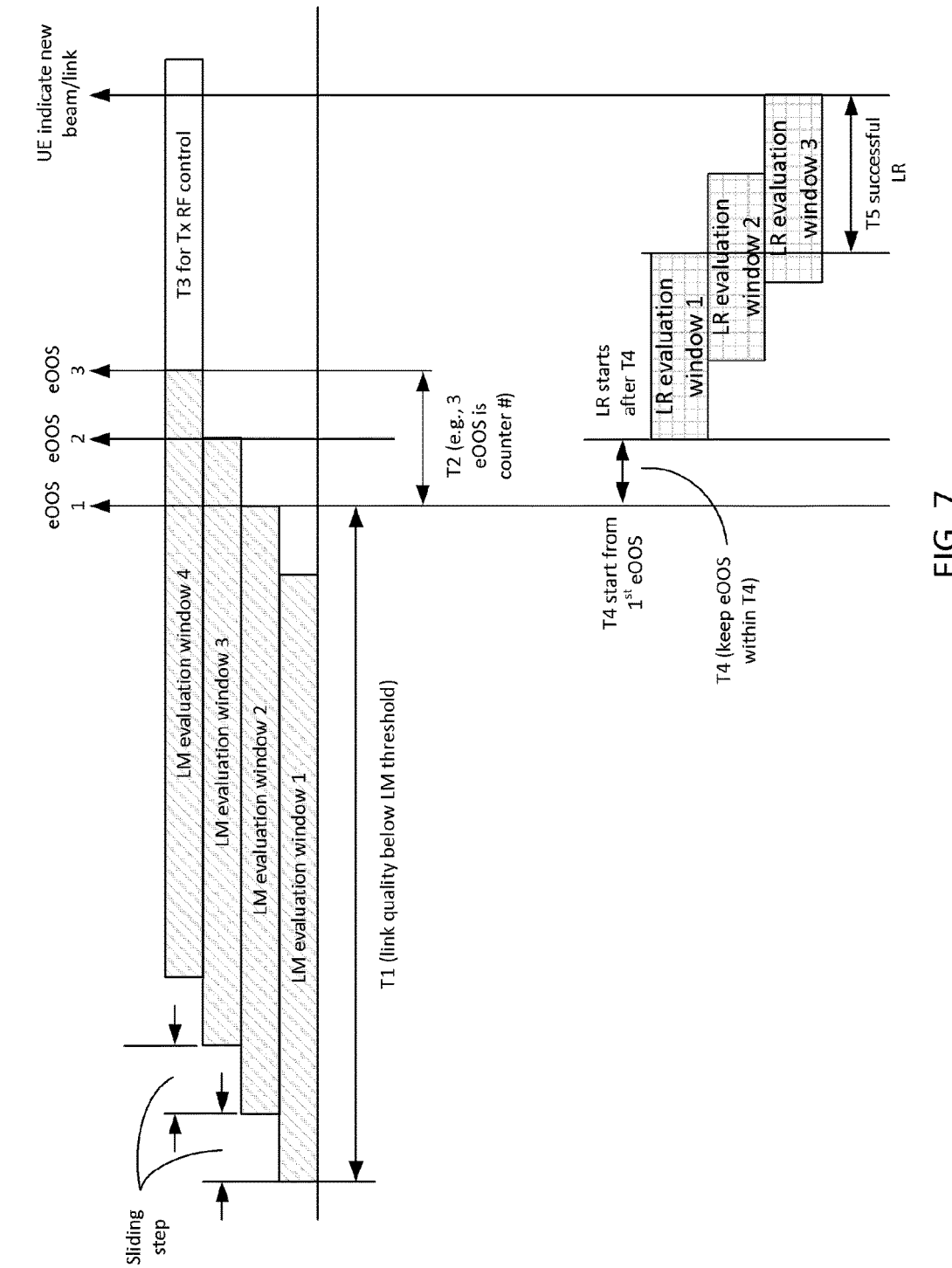
FIG. 7 illustrates another link monitoring/link recovery procedure in accordance with some embodiments.
Figure 8:
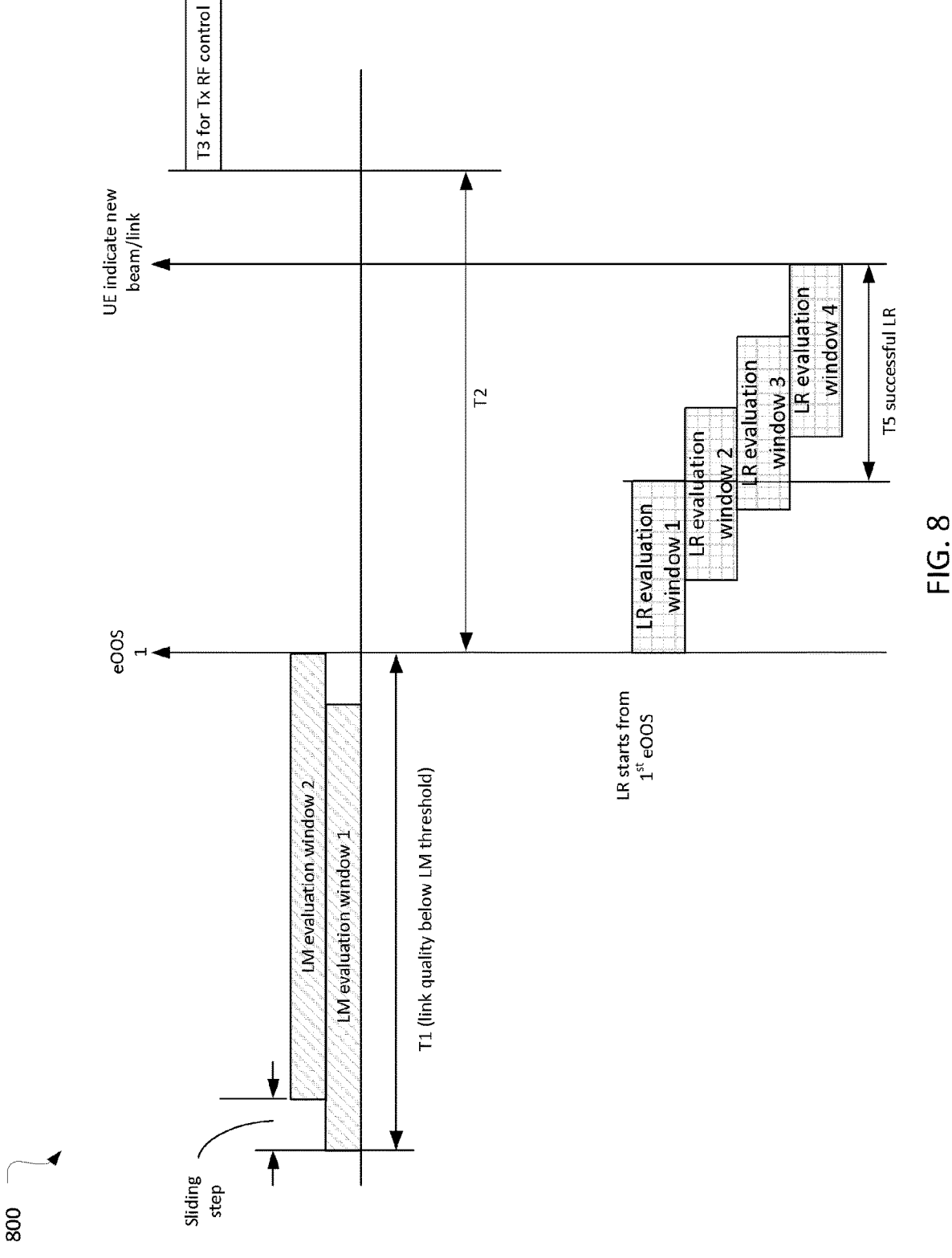
FIG. 8 illustrates another link monitoring/link recovery procedure in accordance with some embodiments.

FIGS. 6-8 illustrate LM/LR procedures that further describe L1 evaluation samples/intervals and timer design in accordance with some embodiments.

FIG. 6 illustrates an LM/LR procedure 600 in accordance with some embodiments. The LM/LR procedure 600 may include LM evaluation windows 1-4, which represents sliding intervals of LM evaluation separated by a sliding step. The sliding step may correspond to the L1 interval discussed elsewhere herein.

The LM evaluation window may be used for eOOS evaluation or pre-alarm evaluation. In some embodiments, a first LM evaluation window may be defined for eOOS evaluation and a second LM evaluation window may be defined for the pre-alarm evaluation.

Each LM evaluation window may have an LM window length. The LM window length may be defined by a TS to align with an L1 measurement period, an L3 measurement period, or an existing RLM-OOS/BFD evaluation window. These periods/windows may be defined in manners similar to that described in clauses 9.2 and 9.5 of 3GPP TS 38.133. Alternatively, the LM window length may be configured by the network. In one option, the network may provide an indication of an explicit sample number that defines the LM window length. For example, the network may indicate the LM window length for eOOS/pre-alarm evaluation may be an amount of time to acquire X measurements of the LM reference signal, where X is an integer. In other options, the network may provide an indication that the LM window length is to align with an L1/L3 measurement period.

Each LM evaluation window may be evaluated to determine whether it triggers an eOOS condition (for example, a predetermined number of LM RSs are associated with an eOOS state within the LM evaluation window).

The network may configure the UE 104 with a value of a first timer (T1) that may be used to trigger eOOS. The UE 104 may evaluate a metric (for example, link quality) within a first period defined by T1 and compare the metric with a specific threshold. As used herein, reference to a specific timer may refer to the period that corresponds to, or is defined by, the timer. For example, "evaluating a metric within T1" may refer to evaluating a metric within a period defined by a specific T1 timer instance.

If the metric is worse than the threshold (for example, link quality is below a quality threshold), then the UE 104 may trigger an eOOS to a higher layer (for example, RRC or MAC). The metric may be RSRP, RSRQ, or SINR. T1 may encompass one or more LM evaluation windows. As shown in FIG. 6, T1 encompasses two LM evaluation windows.

In the event T1 encompasses more than one LM evaluation window, the eOOS condition of the T1 may be based on whether a threshold number of the LM evaluation windows within T1 have an eOOS condition. The threshold number may be one of the LM evaluation windows, all of the LM evaluation windows, or some other number. Consider, for example, that the threshold number is all of the LM evaluation windows. In that case, if all the LM evaluation windows within a first instance of T1 have an eOOS condition (for example, both LM evaluation window 1 and LM evaluation window 2 have eOOS conditions), then the PHY layer of the UE 104 may output eOOS 1 at the end of the first instance of T1. As shown, the PHY layer of the UE 104 may also output eOOS 2 and eOOS 3 at the end of second and third instances of T1, respectively.

The network may also configure a second counter/timer (T2) for an eOOS number. A T2 condition may be met in the event a threshold number of eOOSs are triggered as T1 outputs. This threshold number may be consecutive T1 outputs or T1 outputs within a predetermined period of time. As shown in FIG. 6, the threshold number is three.

If the RRC or MAC layers of the UE 104 determine the T2 condition is met based on the eOOSs reported from the PHY, the UE 104 may: go to an RLF status and turn off the Tx RF directly after expiration of T2; or go to a third timer (T3) to determine whether to turn of Tx RF.

After expiration of T2, the UE 104 may or may not stop LM evaluation.

The network may configure T3 for the UE 104 to turn off the Tx RF circuitry. T3, when configured, may provide the UE 104 time to determine whether the LR is successful. If LR is not successful within T3, then, after expiration of T3, the UE 104 may turn off the transmitter at the RF side and start to perform RRC reestablishment. The UE 104 may also stop LR procedures upon expiration of T3.

If LR is successful before T3 expires, the UE 104 may indicate the new beam/link to the network. In some embodiments, this indication may be a RACH-based indication. For example, the UE 104 may use a RACH occasion (RO) associated with the specific LR reference signal (SSB or CSI-RS) that has a quality above the LR threshold, or may use a preamble to indicate the new beam/link information. In other embodiments, the indication of the new beam/link may be transmitted to the network via MAC or RRC signaling.

The network may configure a fourth timer (T4) for the UE 104 to trigger link recovery. If configured, T4 may start from the first T1 output with an eOOS condition (as shown in FIG. 6), or when T2 expires. If the UE 104 keeps triggering eOOS (as T1 outputs) within T4, the UE 104 may trigger LR when T4 expires. Triggering LR may mean the UE 104 performs LR evaluation based on the LR configuration as discussed elsewhere herein. The UE 104 may or may not stop LM procedures when LR is triggered.

The LM/LR procedure 600 illustrates the LR evaluation using two LR evaluation windows that conclude at the expiration of T3. In this embodiment, the LR evaluation may be unsuccessful and RLF may be triggered. The UE 104 may turn off the transmitter at the RF side and start to perform RRC reestablishment.

FIG. 7 illustrates an LM/LR procedure 700 in accordance with some embodiments. Similar to LM/LR procedure 600, the LM/LR procedure 700 may include LM evaluation windows 1-4, with three consecutive eOOS being output from corresponding T1 instances and a T4 being configured.

In this embodiment, the network may configure a fifth timer (T5) for the UE 104 to perform LR. T5 may start at a beginning of an LR evaluation window or an end of an LR evaluation window. As shown, T5 starts at an end of LR evaluation window 1. In this embodiment, a new good beam may be identified by having an evaluation metric above the LR threshold within the T5 duration. The UE 104 may then indicate the new beam/link by using RACH or MAC/RRC signaling as discussed above.

In some embodiments, the UE 104 may need to find a new beam that meets the evaluation criteria for a consecutive number of LR evaluation windows. If a new beam meets the evaluation criteria for the consecutive number of LR evaluation windows, the UE 104 could indicate successful LR and transmit an indication of the new beam to the network. If the UE 104 determines a candidate beam does not meet the evaluation criteria for an LR evaluation window (before the consecutive number of "good" LR evaluation windows are detected), T5 may be stopped and restarted.

FIG. 8 illustrates an LM/LR procedure 800 in accordance with some embodiments. The LM/LR procedure 700 may include LM evaluation windows 1 and 2, with one eOOS being output from a T1 instance. In LM/LR procedure 700, T4 may not be configured and the LR procedure may start from the first eOOS output from T1. The LM procedure may then stop when the LR procedure is initiated.

In this embodiment, a new good beam may be identified within a configured T5 (for example, evaluation criteria meets the appropriate thresholds in all the LR evaluation windows). The UE 104 may then indicate the new beam/link by using RACH or MAC/RRC signaling as discussed above.

In this embodiment, T2 may have a timer that, upon expiration, may start T3 for Tx RF control.

Table 1 below shows timer definitions in accordance with some embodiments.

TABLE 1

| Timer | Start | Stop | At expiry |
|---|---|---|---|
| T1 | The start of LM evaluation window, or end of the LM evaluation window | LR evaluation start or T3 is running | Indicate eOOS if link quality is below the threshold |
| T2 | First eOOS in a continuous eOOS queue | LR evaluation start or T3 is running or LR is successful | Starts T3 for UE RF |
| T3 | End of T2 | LR is successful | UE would turn off the Tx at RF side and start to perform RRC reestablishment |
| T4 | First eOOS triggering; or end of T2 | LM evaluation is above threshold or no-stop | UE starts to trigger LR evaluation |
| T5 | The start of LR evaluation window, or end of the LR evaluation window | One unsuccessful LR sample happens from one LR evaluation window; or T2 is expired | UE indicate new beam/link |

Figure 9:
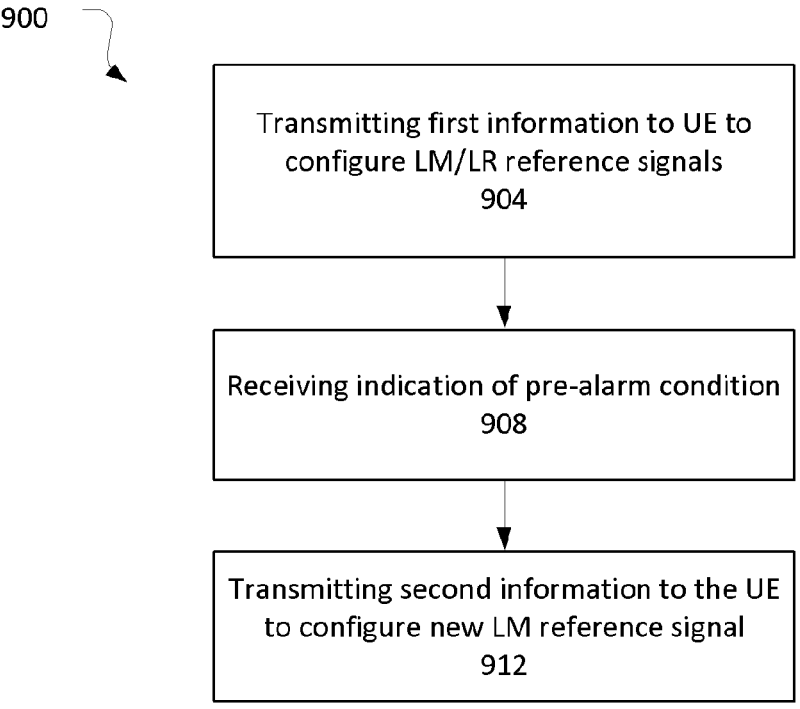
FIG. 9 illustrates another operational flow/algorithmic structure in accordance with some embodiments.

FIG. 9 illustrates an operation flow/algorithmic structure 900 in accordance with some embodiments. The operation flow/algorithmic structure 900 may be implemented by the base station 108 to facilitate harmonized LM/LR.

The operation flow/algorithmic structure 900 may include, at 904, transmitting first information to the UE 104 to configure LM/LR reference signals. The first information may include any of the enhancedLRandLMConfig IEs described above.

The first information may configure the LM/LR reference signals as any combination of SSB/CSI-RSs. If CSI-RS is used, the LR reference signals may include AP CSI-RS, SP CSI-RS, or P-CSI-RS; and the LM reference signals may include SP CSI-RS or P-CSI-RS.

The first information may additionally configure other parameters that may be used to facilitate LM/LR procedures.

For example, the first information may also include configuration of which measurement metrics and thresholds may be used. For example, SINR, RSRP, RSRQ, target BLER metrics/thresholds may be provided. For another example, the first information may also include configuration parameters to define timers/periods (for example, T1-T5), evaluation windows, etc.

In some embodiments, the first information may configure pre-alarm thresholds/evaluation durations for individual LM reference signals. In other embodiments, the first information may configure a common pre-alarm threshold/evaluation duration for a plurality of LM reference signals.

The first information may be transmitted in one or more configuration signals.

The operation flow/algorithmic structure 900 may further include, at 908, receiving an indication of a pre-alarm condition. The format and the content of the indication may be based on the type of enhancedLRandLMConfig IE transmitted in the first information. The indication may be similar to that described above with respect to either of the Pre-alarmIndication IEs.

The operation flow/algorithmic structure 900 may further include, at 912, transmitting second information to the UE 104 to configure a new LM reference signal. The base station 108 may configure the new LM reference signal in an attempt to avoid further deterioration of the existing LM reference signals causing an RLF.

In some embodiments, the UE 104 may be enabled with beam sweeping to facilitate harmonized LM/LR procedures. For example, the UE 104 may be allowed to perform beam sweeping with respect to all of the LM/LR reference signals with which it is configured. This may be the case whether or not the LM/LR reference signals are provided with QCL information. For example, if an LM/LR reference signal is provided as an SSB, which may correspond to a rough beam, the UE 104 may be allowed to sweep the fine beams (for example, CSI-RSs) that are covered by the rough beam of the SSB. The UE 104 may use this beam sweeping process to select the beam on which communications and further LM/LR procedures are performed. In various embodiments, the UE 104 may use rough beam or fine beam sweeping for the LM/LR reference signals.

In some embodiments, the UE 104 may be configured with a plurality of CORESETs, one of which may be the active CORESET and others may be candidate CORESETs. An LM/LR reference signal may be associated with each of the configured CORESETs. The UE 104 may do beam sweeping based on beam information from the QCL information in the plurality of configured CORESETs. For example, the UE 104 may sweep fine beams corresponding to each rough beam provided by the QCL information of a configured CORESET. In this manner, for each LM/LR reference signal, the UE 104 may find another beam/reference signal that may be used as a basis for the LM/LR procedures.

Figure 10:
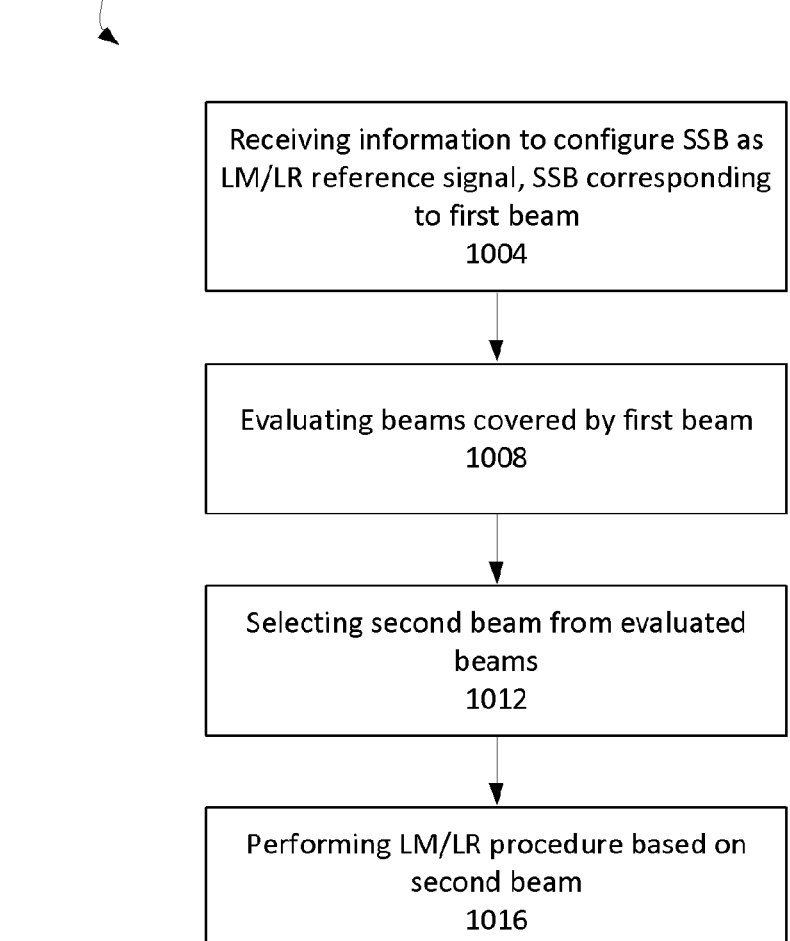
FIG. 10 illustrates another operational flow/algorithmic structure in accordance with some embodiments.

FIG. 10 illustrates an operation flow/algorithmic structure 1000 in accordance with some embodiments. The operation flow/algorithmic structure 1000 may be implemented by the UE 104 for performing a harmonized LM/LR procedure.

The operation flow/algorithmic structure 1000 may include, at 1004, receiving information to configure and SSB as an LM/LR reference signal. The SSB may correspond to a first beam. The first beam may be a rough beam.

The operation flow/algorithmic structure 1000 may further include, at 1008, evaluating beams covered by the first beam. For example, the UE 104 may perform a beam sweeping operation to evaluate each fine beam that is covered by the first beam.

The operation flow/algorithmic structure 1000 may further include, at 1012, selecting a second beam from the evaluated beams. The second beam may be a fine beam that is associated with an evaluation metric that has a higher quality than the first beam and other fine beams.

The operation flow/algorithmic structure 1000 may further include, at 1016, performing an LM/LR procedure based on the second beam.

In this manner, the UE 104 may update one or more of the initially configured LM/LR reference signals at its own discretion. In some embodiments, the UE 104 may signal, to the network, an indication of the updated LM/LR reference signals once identified.

In some embodiments, the network environment 100 may include a plurality of TRPs to send/receive communications to/from the UE 104 using CORESETs of at least two CORESET pools. This may be referred to as a multiple TRP (mTRP) scenario. In these embodiments, the base station 108 may configure the UE 104 with LM/LR resources per TRP, per CORESET pool, or only for an anchor TRP of the plurality of TRPs. The UE 104 may then perform the LM/LR evaluations in a TRP specific manner, a CORESET-pool specific manner, or only on the anchor TRP.

In some embodiments, the base station 108 may communicate with the UE 104 using carrier aggregation (CA). In CA, one or more serving cells may be established on a corresponding one or more component carriers (CCs). In this situation, the base station 108 may configure the LM/LR resources based on CC level. For example, LM/LR evaluation and resource set configuration may be for the PCell/PSCell only, or for the PCell/PSCell and any secondary serving cell configured with independent beam management (IBM) in CA.

Figure 11:
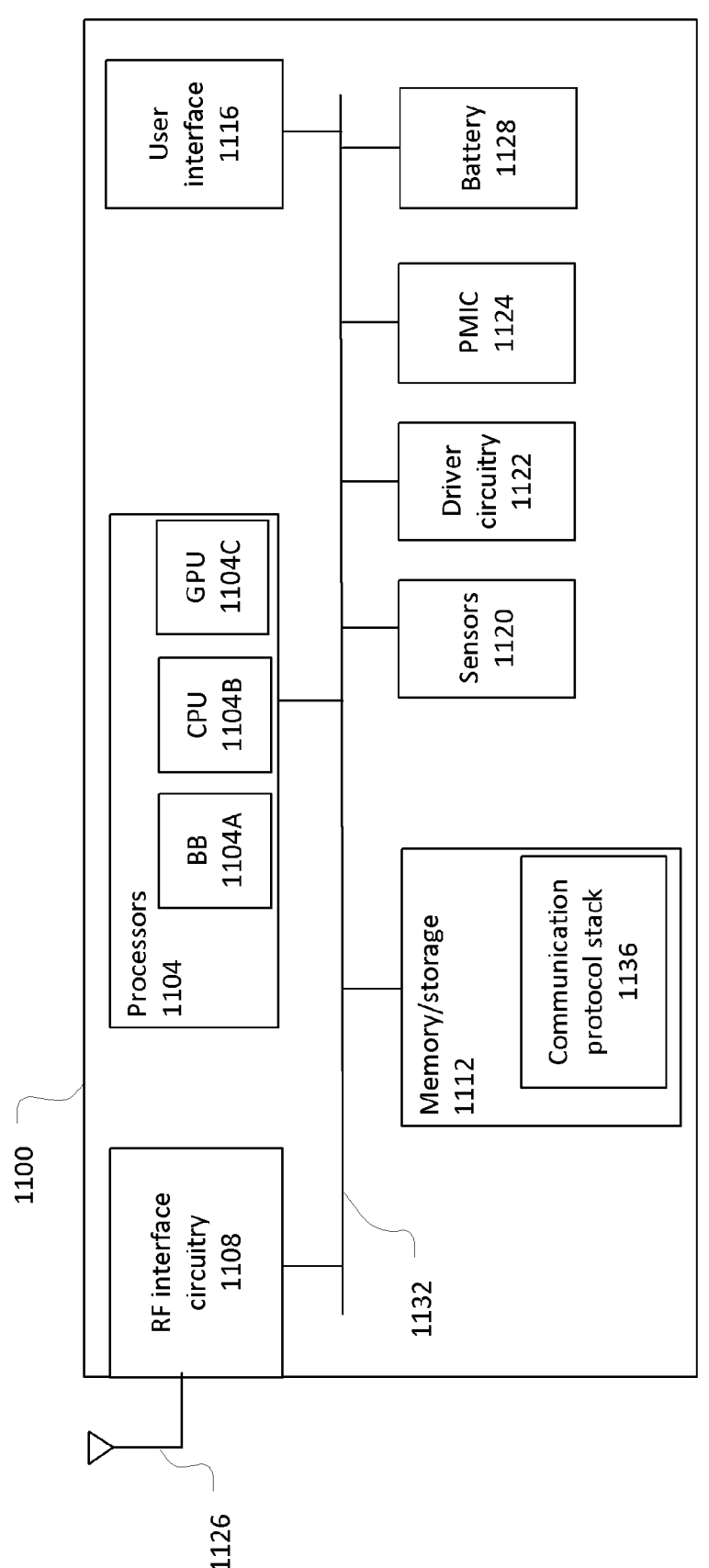
FIG. 11 illustrates a user equipment in accordance with some embodiments.

FIG. 11 illustrates a UE 1100 in accordance with some aspects. The UE 1100 may be similar to and substantially interchangeable with UE 104.

The UE 1100 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices, proximity sensors, vehicle-based UEs, infrastructure-based UEs.

The UE 1100 may include processors 1104, RF interface circuitry 1108, memory/storage 1112, user interface 1116, sensors 1120, driver circuitry 1122, power management integrated circuit (PMIC) 1124, antenna structure 1126, and battery 1128. The components of the UE 1100 may be implemented as integrated circuits (ICs), portions thereof, discrete electronic devices, or other modules, logic, hardware, software, firmware, or a combination thereof. The block diagram of FIG. 11 is intended to show a high-level view of some of the components of the UE 1100. However, some of the components shown may be omitted, additional components may be present, and different arrangement of the components shown may occur in other implementations.

The components of the UE 1100 may be coupled with various other components over one or more interconnects 1132, which may represent any type of interface, input/output, bus (local, system, or expansion), transmission line, trace, optical connection, etc. that allows various circuit components (on common or different chips or chipsets) to interact with one another.

The processors 1104 may include processor circuitry such as, for example, baseband processor circuitry (BB) 1104A, central processor unit circuitry (CPU) 1104B, and graphics processor unit circuitry (GPU) 1104C. The processors 1104 may include any type of circuitry or processor circuitry that executes or otherwise operates computer-executable instructions, such as program code, software modules, or functional processes from memory/storage 1112 to cause the UE 1100 to perform operations as described herein.

In some aspects, the baseband processor circuitry 1104A may access a communication protocol stack 1136 in the memory/storage 1112 to communicate over a 3GPP compatible network. In general, the baseband processor circuitry 1104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some aspects, the PHY layer operations may additionally/alternatively be performed by the components of the RF interface circuitry 1108.

The baseband processor circuitry 1104A may generate or process baseband signals or waveforms that carry information in 3GPP-compatible networks. In some aspects, the waveforms for NR may be based cyclic prefix OFDM (CP-OFDM) in the uplink or downlink, and discrete Fourier transform spread OFDM (DFT-S-OFDM) in the uplink.

The memory/storage 1112 may include one or more non-transitory, computer-readable media that includes instructions (for example, communication protocol stack 1136) that may be executed by one or more of the processors 1104 to cause the UE 1100 to perform various operations described herein. The memory/storage 1112 may also store information related to harmonized LM/LR procedures (including, for example, configuration parameters for LM/LR resources, thresholds, timers, and evaluation windows) as described elsewhere.

The memory/storage 1112 include any type of volatile or non-volatile memory that may be distributed throughout the UE 1100. In some aspects, some of the memory/storage 1112 may be located on the processors 1104 themselves (for example, L1 and L2 cache), while other memory/storage 1112 is external to the processors 1104 but accessible thereto via a memory interface. The memory/storage 1112 may include any suitable volatile or non-volatile memory such as, but not limited to, dynamic random access memory (DRAM), static random access memory (SRAM), erasable programmable read only memory (EPROM), electrically erasable programmable read only memory (EEPROM), Flash memory, solid-state memory, or any other type of memory device technology.

The RF interface circuitry 1108 may include transceiver circuitry and radio frequency front module (RFEM) that allows the UE 1100 to communicate with other devices over a radio access network. The RF interface circuitry 1108 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 1126 and proceed to filter and amplify (with a low-noise amplifier) the signal. The signal may be provided to a receiver of the transceiver that down-converts the RF signal into a baseband signal that is provided to the baseband processor of the processors 1104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 1126.

In various aspects, the RF interface circuitry 1108 may be configured to transmit/receive signals in a manner compatible with NR access technologies.

The antenna 1126 may include antenna elements to convert electrical signals into radio waves to travel through the air and to convert received radio waves into electrical signals. The antenna elements may be arranged into one or more antenna panels. The antenna 1126 may have antenna panels that are omnidirectional, directional, or a combination thereof to enable beamforming and multiple input, multiple output communications. The antenna 1126 may include microstrip antennas, printed antennas fabricated on the surface of one or more printed circuit boards, patch antennas, phased array antennas, etc. The antenna 1126 may have one or more panels designed for specific frequency bands including bands in FR1, FR2, and above.

The user interface circuitry 1116 includes various input/output (I/O) devices designed to enable user interaction with the UE 1100. The user interface 1116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 1100.

The sensors 1120 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 1122 may include software and hardware elements that operate to control particular devices that are embedded in the UE 1100, attached to the UE 1100, or otherwise communicatively coupled with the UE 1100. The driver circuitry 1122 may include individual drivers allowing other components to interact with or control various input/output (I/O) devices that may be present within, or connected to, the UE 1100. For example, driver circuitry 1122 may include a display driver to control and allow access to a display device, a touchscreen driver to control and allow access to a touchscreen interface, sensor drivers to obtain sensor readings of sensor circuitry 1120 and control and allow access to sensor circuitry 1120, drivers to obtain actuator positions of electro-mechanic components or control and allow access to the electro-mechanic components, a camera driver to control and allow access to an embedded image capture device, audio drivers to control and allow access to one or more audio devices.

The PMIC 1124 may manage power provided to various components of the UE 1100. In particular, with respect to the processors 1104, the PMIC 1124 may control power-source selection, voltage scaling, battery charging, or DC-to-DC conversion.

A battery 1128 may power the UE 1100, although in some examples the UE 1100 may be mounted deployed in a fixed location, and may have a power supply coupled to an electrical grid. The battery 1128 may be a lithium ion battery, a metal-air battery, such as a zinc-air battery, an aluminum-air battery, a lithium-air battery, and the like. In some implementations, such as in vehicle-based applications, the battery 1128 may be a typical lead-acid automotive battery.

Figure 12:
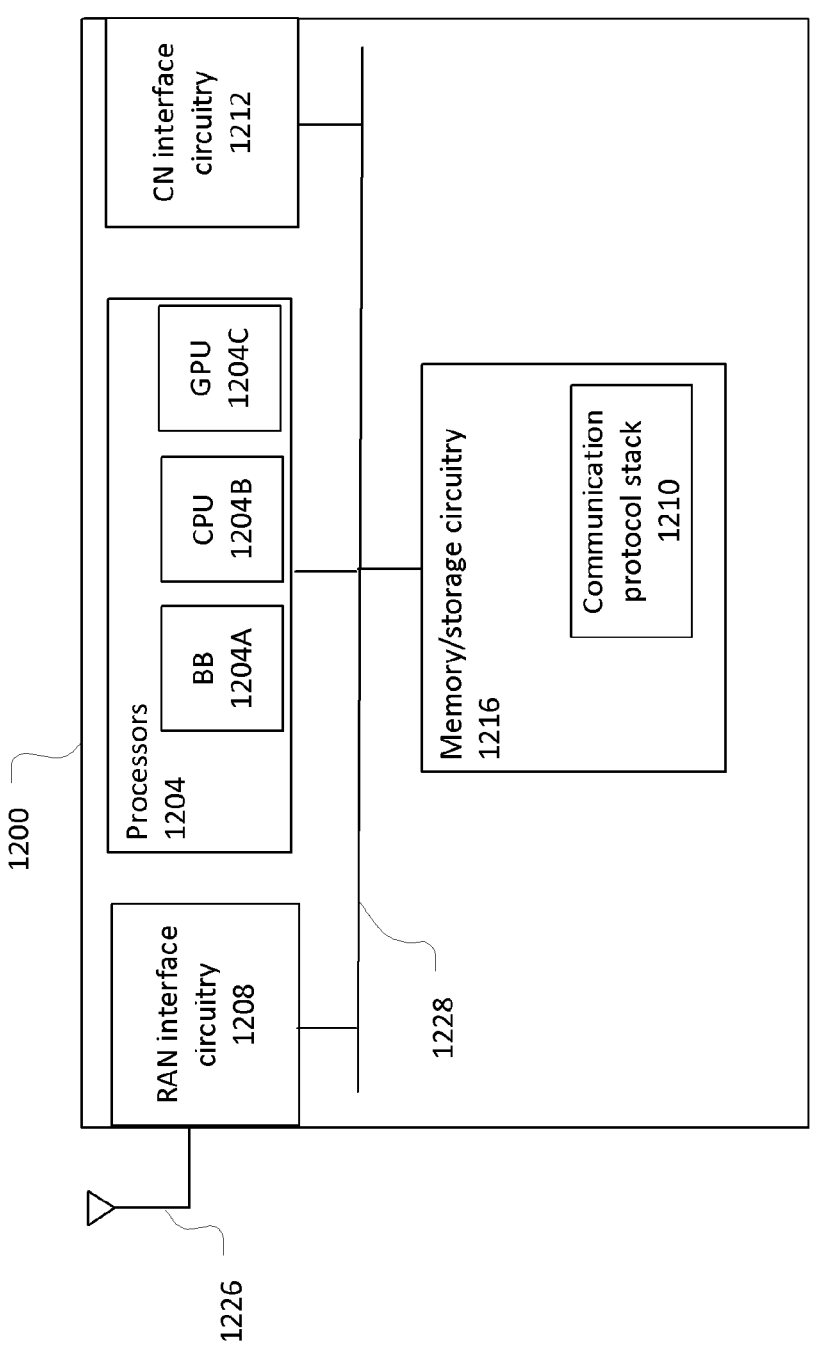
FIG. 12 illustrates a base station in accordance with some embodiments.

FIG. 12 illustrates a base station 1200 in accordance with some embodiments. The base station 1200 may be similar to and substantially interchangeable with base station 108.

The base station 1200 may include processors 1204, RF interface circuitry 1208, core network (CN) interface circuitry 1212, memory/storage circuitry 1216, and antenna structure 1226.

The components of the base station 1200 may be coupled with various other components over one or more interconnects 1228.

The processors 1204, RF interface circuitry 1208, memory/storage circuitry 1216 (including communication protocol stack 1210), antenna structure 1226, and interconnects 1228 may be similar to like-named elements shown and described with respect to FIG. 11.

The CN interface circuitry 1212 may provide connectivity to a core network, for example, a $5^{th}$ Generation Core network (5GC) using a 5GC-compatible network interface protocol such as carrier Ethernet protocols or some other suitable protocol. Network connectivity may be provided to/from the base station 1200 via a fiber optic or wireless backhaul. The CN interface circuitry 1212 may include one or more dedicated processors or FPGAs to communicate using one or more of the aforementioned protocols. In some implementations, the CN interface circuitry 1212 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more aspects, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary aspects are provided.

Example 1 includes a method of operating a user equipment (UE), the method comprising: receiving information to configure one or more link management (LM) reference signals (RSs) and at least one link recovery (LR) RS; monitoring the one or more LM RSs; detecting a pre-alarm condition based on said monitoring of the LM RSs; and transmitting an indication of the pre-alarm condition to a network.

Example 2 includes the method of example 1 or some other example herein, further comprising: detecting an enhanced out-of-state (eOOS) condition based on an eOOS state of a predetermined number of the one or more LM RSs; and performing an LR evaluation based on said detecting of the eOOS condition.

Example 3 includes the method of example 2 or some other example herein, wherein the predetermined number is one or all of the one or more LM RSs.

Example 4 includes the method of example 1 or some other example herein, further comprising: performing an LR evaluation based on said detecting of the pre-alarm condition.

Example 5 includes the method of any one of examples 2-4 or some other example herein, wherein performing the LR evaluation comprises: determining a first LR RS of the at least one LR RS has an acceptable evaluation metric based on a predetermined threshold and transmitting an indication of the first LR RS to the network; or determining none of the at least one LR RS has an acceptable evaluation metric based on a predetermined threshold and triggering a radio link failure.

Example 6 includes the method of example 5 or some other example herein, wherein the predetermined threshold is a signal-to-interference-plus-noise (SINR) threshold, a block error ratio (BLER) threshold, a reference signal receive quality (RSRQ threshold, or a reference signal receive power (RSRP) threshold.

Example 7 includes the method of example 1 or some other example herein, further comprising: determining an evaluation metric of a first LM RS of the one or more LM RSs; comparing the evaluation metric to a pre-determined threshold; and detecting the pre-alarm condition based on said comparing of the evaluation metric to the pre-determined threshold.

Example 8 includes the method of example 7 or some other example herein, wherein the predetermined threshold is a signal-to-interference-plus-noise (SINR) threshold, a block error ratio (BLER) threshold, a reference signal receive quality (RSRQ) threshold, or a reference signal receive power (RSRP) threshold.

Example 9 includes the method of example 1 or some other example herein, further comprising: receiving, from the network in response to the indication of the pre-alarm condition, information to configure an LM RS other than the one or more LM RSs; and monitoring the LM RS.

Example 10 includes the method of example 1 or some other example herein, wherein the one or more LM RSs comprises a subset of the at least one LR RS.

Example 11 includes the method of example 1 or some other example herein, wherein the one or more LM RSs respectively correspond to one or more RSs in transmission configuration indicators (TCIs) of control resource sets (CORESETs).

Example 12 includes the method of example 11 or some other example herein, wherein the at least one LR RS comprise one or more LR RSs that respectively correspond to the one or more LM RSs.

Example 13 includes the method of example 1 or some other example herein, wherein the indication includes a serving cell index and a pre-alarm indication list that includes an identifier of an LM RS of the one or more LM RSs that is associated with the pre-alarm condition.

Example 14 includes a method of operating a base station, the method comprising: transmitting first information to a user equipment (UE) to configure one or more link management (LM) reference signals (RSs) and at least one link recovery (LR) RS; receiving an indication of a pre-alarm condition; and transmitting, based on the indication, second information to the UE to configure the UE with an LM RS that is not included in the one or more LM RSs.

Example 15 includes the method of example 14 or some other example herein, wherein the indication is a first indication and the method further comprises: receiving a second indication that indicates a first LR RS of the at least one LR RS has an acceptable quality; and configuring the UE to communicate using a beam or link that corresponds to the first LR RS.

Example 16 includes the method of example 14 or some other example herein, wherein the one or more LM RSs and the at least one LR RS comprise synchronization signal and physical broadcast channel (SSB) signals or channel state information-reference signals (CSI-RSs).

Example 17 includes the method of example 16 or some other example herein, wherein the one or more LM RSs comprise one or more semi-persistent (SP) CSI-RSs or periodic-CSI-RSs (P-CSI-RSs) and the at least one LR RS comprises at least one aperiodic (AP) CSI-RS, SP CSI-RS, or P-CSI-RS.

Example 18 includes the method of example 14 or some other example herein, wherein the first information is further to configure a pre-alarm threshold or a pre-alarm evaluation duration.

Example 19 includes the method of example 18 or some other example herein, wherein the first information is further to configure a signal-to-noise-plus-interference (SINR), reference signal receive power (RSRP), a block error ratio (BLER), or a reference signal receive quality (RSRQ) values as a pre-alarm threshold.

Example 20 includes the method of example 18 or some other example herein, wherein the first information is to configure pre-alarm thresholds and pre-alarm evaluation durations for individual RSs of the one or more LM RSs or is to configure one pre-alarm threshold and one pre-alarm evaluation duration for all of the one or more LM RSs.

Example 21 includes the method of example 14 or some other example herein, wherein the first information is further to configure a threshold for detection of an enhanced out-of-sync (eOOS) condition, LR evaluation, or detection of the pre-alarm condition, wherein the threshold is a reference signal receive power (RSRP) threshold, a signal-to-noiseplus-interference ratio (SINR) threshold, a reference signal receive quality (RSRQ) threshold, or a target block error ratio (BLER) threshold.

Example 22 includes the method of example 14 or some other example herein, wherein the first information is further to configure an evaluation window for detecting an enhanced out-of-sync (eOOS) condition, performing an LR evaluation, or detecting the pre-alarm condition.

Example 23 includes the method of example 22 or some other example herein, wherein the evaluation window is a sliding window and the first information is further to configure a layer 1 (L1) interval to provide a sliding step for the sliding window.

Example 24 includes the method of example 14 or some other example herein, wherein the first information is to further configure a first timer (T1) for detecting an enhanced out-of-sync (eOOS) condition, wherein the first timer is to encompass one or more LM evaluation windows.

Example 25 includes the method of example 14 or some other example herein, wherein the first information is to further configure a first timer or counter (T2) to set a threshold number of detected enhanced out-of-sync (eOOS) conditions that is to trigger a radio link failure status or a second timer.

Example 26 includes the method of example 25 or some other example herein, wherein the threshold number of detected eOOS conditions is to trigger a second timer (T3), wherein the UE is to determine whether an LR is successful before expiration of the second timer, and wherein the UE is to turn off Tx RF on expiration of the second timer.

Example 27 includes the method of example 14 or some other example herein, wherein the first information is further to configure a first timer (T4) that is to start from detection of a first enhanced out-of-sync (eOOS) condition or expiration of a second timer or counter that sets a threshold number of detected eOOS conditions, wherein the UE is to start an LR evaluation upon expiration of the first timer.

Example 28 includes the method of example 14 or some other example herein, wherein the first information is further to configure a first timer (T5) for performing an LR evaluation, the first timer to start at a start or end of an LR evaluation window.

Example 29 includes the method of example 14 or some other example herein, wherein a plurality of transmit-receive points (TRPs) are to send/receive communications to/from the UE using control resource sets (CORESETs) of at least two CORESET pools, and the first information is to configure LM/LR resources for: individual TRPs of the plurality of TRPs; individual CORESET pools of the at least two CORESET pools, or only an anchor TRP of the plurality of TRPs.

Example 30 includes the method of example 14 or some other example herein, wherein the base station is to communicate with the UE using carrier aggregation and the first information is to configure LM/LR resources for: a primary serving cell; or a primary serving cell and one or more secondary cells that are configured with independent beam management.

Example 31 includes a method comprising: receiving information to configure a synchronization signal block (SSB) as a link management (LM) or link recovery (LR) reference signal (RS), the SSB corresponding to a first beam; evaluating a plurality of beams that are covered by the first beam; and selecting a second beam from the plurality of plurality of beams based on said evaluating the plurality of beams; and performing an LM or LR procedure based on the second beam.

Example 32 includes the method of example 31 or some other example herein, wherein the second beam is a channel state information-reference signal.

Example 33 includes the method of example 31 or some other example herein, wherein the information is to configure a plurality of control resource set (CORESET)s respectively associated with a first plurality of LM/LR reference signals, wherein a first CORESET of the plurality of CORESETs is an active CORESET and other CORESETs of the plurality of CORESETs are candidate CORESETs, wherein the method further comprises: performing beam sweeping in each of the plurality of CORESETS to identify a second plurality of LM/LR reference signals; and performing LM/LR procedures using the second plurality of LM/LR reference signals.

Example 34 may include an apparatus comprising means to perform one or more elements of a method described in or related to any of examples 1-33, or any other method or process described herein.

Example 35 may include one or more non-transitory computer-readable media comprising instructions to cause an electronic device, upon execution of the instructions by one or more processors of the electronic device, to perform one or more elements of a method described in or related to any of examples 1-33, or any other method or process described herein.

Example 36 may include an apparatus comprising logic, modules, or circuitry to perform one or more elements of a method described in or related to any of examples 1-33, or any other method or process described herein.

Example 37 may include a method, technique, or process as described in or related to any of examples 1-33, or portions or parts thereof.

Example 38 may include an apparatus comprising: one or more processors and one or more computer-readable media comprising instructions that, when executed by the one or more processors, cause the one or more processors to perform the method, techniques, or process as described in or related to any of examples 1-33, or portions thereof.

Example 39 may include a signal as described in or related to any of examples 1-33, or portions or parts thereof.

Example 40 may include a datagram, information element, packet, frame, segment, PDU, or message as described in or related to any of examples 1-33, or portions or parts thereof, or otherwise described in the present disclosure.

Example 41 may include a signal encoded with data as described in or related to any of examples 1-33, or portions or parts thereof, or otherwise described in the present disclosure.

Example 42 may include a signal encoded with a datagram, IE, packet, frame, segment, PDU, or message as described in or related to any of examples 1-33, or portions or parts thereof, or otherwise described in the present disclosure.

Example 43 may include an electromagnetic signal carrying computer-readable instructions, wherein execution of the computer-readable instructions by one or more processors is to cause the one or more processors to perform the method, techniques, or process as described in or related to any of examples 1-33, or portions thereof.

Example 44 may include a computer program comprising instructions, wherein execution of the program by a processing element is to cause the processing element to carry out the method, techniques, or process as described in or related to any of examples 1-33, or portions thereof.

Example 45 may include a signal in a wireless network as shown and described herein.

Example 46 may include a method of communicating in a wireless network as shown and described herein.

Example 47 may include a system for providing wireless communication as shown and described herein.

Example 48 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of aspects to the precise form disclosed. Modifications and variations are possible in light of the above teachings or may be acquired from practice of various aspects.

Although the aspects above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   processor circuitry to:
   receive first information to configure at least one link management (LM) reference signal (RS) and at least one link recovery (LR) RS;
   monitor the at least one LM RS;
   detect a pre-alarm condition based on the monitored at least one LM RS;
   generate, based on the detection of the pre-alarm condition, an indication of the pre-alarm condition for transmission to a network;
   receive, from the network based on the indication of the pre-alarm condition, second information to configure a first LM RS that is not included in the at least one LM RS; and
   monitor the first LM RS; and
   interface circuitry coupled to the processor circuitry to receive the first information to configure the at least one LM RS and the at least one LR RS.

2. The apparatus of claim 1, wherein the processor circuitry is further to:
   detect an enhanced out-of-state (eOOS) condition based on an eOOS state of a predetermined number of the at least one LM RS; and
   perform an LR evaluation based on the detected eOOS condition.

3. The apparatus of claim 2, wherein the predetermined number is one or all of the at least one LM RS.

4. The apparatus of claim 1, wherein the processor circuitry is further to:
   perform an LR evaluation based on the detected pre-alarm condition.

5. The apparatus of claim 4, wherein to perform the LR evaluation the processor circuitry is to:
   determine a first LR RS of the at least one LR RS has an acceptable evaluation metric based on a predetermined threshold and transmitting an indication of the first LR RS to the network; or
   determine none of the at least one LR RS has an acceptable evaluation metric based on a predetermined threshold and triggering a radio link failure.

6. The apparatus of claim 5, wherein the predetermined threshold is a signal-to-interference-plus-noise (SINR)

threshold, a block error ratio (BLER) threshold, a reference signal receive quality (RSRQ) threshold, or a reference signal receive power (RSRP) threshold.

7. The apparatus of claim 1, wherein the processor circuitry is further to:

determine an evaluation metric of a second LM RS of the at least one LM RS;

compare the evaluation metric to a predetermined threshold; and detect the pre-alarm condition based on comparison of the evaluation metric to the predetermined threshold.

8. The apparatus of claim 7, wherein the predetermined threshold is a signal-to-interference-plus-noise (SINR) threshold, a block error ratio (BLER) threshold, a reference signal receive quality (RSRQ) threshold, or a reference signal receive power (RSRP) threshold.

9. The apparatus of claim 1, wherein the at least one LM RS comprises a subset of the at least one LR RS.

10. An apparatus comprising:

processing circuitry to:

generate first information for transmission to a user equipment (UE) to configure at least one link management (LM) reference signal (RS) and at least one link recovery (LR) RS;

receive an indication of a pre-alarm condition; and generate, based on the indication, second information for transmission to the UE to configure the UE with an LM RS that is not included in the at least one LM RS; and interface circuitry coupled with the processing circuitry to transmit the first information.

11. The apparatus of claim 10, wherein the indication is a first indication and the processing circuitry is further to:

receive a second indication that indicates a first LR RS of the at least one LR RS has an acceptable quality; and generate, based on the second indication, third information for transmission to the UE to configure the UE to communicate using a beam or link that corresponds to the first LR RS.

12. The apparatus of claim 10, wherein the at least one LM RS and the at least one LR RS comprise synchronization signal and physical broadcast channel (SSB) signals or channel state information-reference signals (CSI-RSs).

13. The apparatus of claim 12, wherein the at least one LM RS comprises at least one semi-persistent (SP) CSI-RS or periodic-CSI-RS (P-CSI-RS) and the at least one LR RS comprises at least one aperiodic (AP) CSI-RS, SP CSI-RS, or P-CSI-RS.

14. The apparatus of claim 10, wherein the first information is further to configure a pre-alarm threshold or a pre-alarm evaluation duration.

15. The apparatus of claim 14, wherein the first information is further to configure a signal-to-noise-plus-interference (SINR), reference signal receive power (RSRP), a block error ratio (BLER), or a reference signal receive quality (RSRQ) values as a pre-alarm threshold.

16. The apparatus of claim 14, wherein the first information is to configure pre-alarm thresholds and pre-alarm evaluation durations for individual RSs of the at least one LM RS or is to configure one pre-alarm threshold and one pre-alarm evaluation duration for all of the at least one LM RS.

17. The apparatus of claim 10, wherein the first information is further to configure a threshold for detection of an enhanced out-of-sync (eOOS) condition, LR evaluation, or detection of the pre-alarm condition, wherein the threshold is a reference signal receive power (RSRP) threshold, a signal-to-noise-plus-interference ratio (SINR) threshold, a reference signal receive quality (RSRQ) threshold, or a target block error ratio (BLER) threshold.

18. A method comprising:

receiving first information to configure at least one link management (LM) reference signal (RS) and at least one link recovery (LR) RS;

determining a condition associated with a pre-alarm state; and monitoring the at least one LM RS for the condition;

detecting the condition based on the monitored at least one LM RS;

generating, based on said detecting the condition, an indication of the condition for transmission to a network;

receiving, from the network based on the indication of the pre-alarm condition, second information to configure a first LM RS that is not included in the at least one LM RS; and monitoring the first LM RS.

19. The method of claim 18, wherein the indication is a first indication and the method further comprises:

generating, for transmission to the network, a second indication that indicates a first LR RS of the at least one LR RS has an acceptable quality; and receiving, based on the second indication, third information to configure communication using a beam or link that corresponds to the first LR RS.

20. The method of claim 18, wherein the first information is further to configure a pre-alarm threshold or a pre-alarm evaluation duration.

* * * * *